US012668682B2

(12) United States Patent
Alshahrani et al.

(10) Patent No.: US 12,668,682 B2
(45) Date of Patent: Jun. 30, 2026

(54) CURABLE COMPOSITION CONTAINING RICE HUSK ASH BIOSILICA TOUGHENED EPOXY RESIN

(71) Applicant: NAJRAN UNIVERSITY, Najran (SA)

(72) Inventors: Hassan A. Alshahrani, Najran (SA); V. R. Arun Prakash, Najran (SA)

(73) Assignee: NAJRAN UNIVERSITY, Najran (SA)

( * ) Notice: Subject to any disclaimer, the term of this patent is extended or adjusted under 35 U.S.C. 154(b) by 507 days.

(21) Appl. No.: 18/337,544

(22) Filed: Jun. 20, 2023

(65) Prior Publication Data

US 2024/0425677 A1     Dec. 26, 2024

(51) Int. Cl.
| | |
|---|---|
| *C08K 9/06* | (2006.01) |
| *C01B 33/16* | (2006.01) |
| *C01B 33/32* | (2006.01) |
| *C08G 59/24* | (2006.01) |
| *C08G 59/50* | (2006.01) |
| *C09C 1/30* | (2006.01) |
| *C09C 3/12* | (2006.01) |

(52) U.S. Cl.
CPC .............. *C08K 9/06* (2013.01); *C01B 33/166* (2013.01); *C01B 33/325* (2013.01); *C08G 59/245* (2013.01); *C08G 59/502* (2013.01); *C09C 1/3081* (2013.01); *C09C 3/12* (2013.01); *C08K 2201/005* (2013.01)

(58) Field of Classification Search
None
See application file for complete search history.

(56) References Cited

U.S. PATENT DOCUMENTS

| | | | |
|---|---|---|---|
| 2006/0041086 A1* | 2/2006 | Birsak | C08F 283/08 525/391 |
| 2021/0016246 A1* | 1/2021 | Gray | B01D 15/08 |

FOREIGN PATENT DOCUMENTS

| | | |
|---|---|---|
| CN | 111718170 A | 9/2020 |
| CN | 111763405 A | 10/2020 |
| CN | 114058153 B | 9/2022 |
| IN | 202141038854 | 9/2021 |

OTHER PUBLICATIONS

Mozafari et al. ; The effect of adding CoFeO—CdSnanoparticles on the mechanicalproperties of rice husk ash epoxycomposite: an experimental approach ; Applied Physics A 125. Article No. 330 ; Apr. 15, 2019 ; 2 Pages ; Abstract Only.

Zhou et al. ; Synthesis and CO adsorption performance of TEPA-loadedcellulose whisker/silica composite aerogel ; Colloids and Surfaces A: Physicochemical and Engineering Aspects, vol. 631 ; Dec. 20, 2021 ; 2 Pages ; Abstract Only.

* cited by examiner

*Primary Examiner* — Peter A Salamon
(74) *Attorney, Agent, or Firm* — Oblon, McClelland, Maier & Neustadt, L.L.P.

(57) ABSTRACT

A curable composition includes at least one polyamine; an epoxy resin; and a silane-modified biosilica material. The silane-modified biosilica material is derived from rice husk and is present in the curable composition at a concentration of 0.01 to 10 wt. %, based on the total weight of the curable composition. The silane-modified biosilica material has an average particle size of 1 to 10 micrometers (μm). A method of making a cured composite material from the curable composition.

20 Claims, 11 Drawing Sheets

50

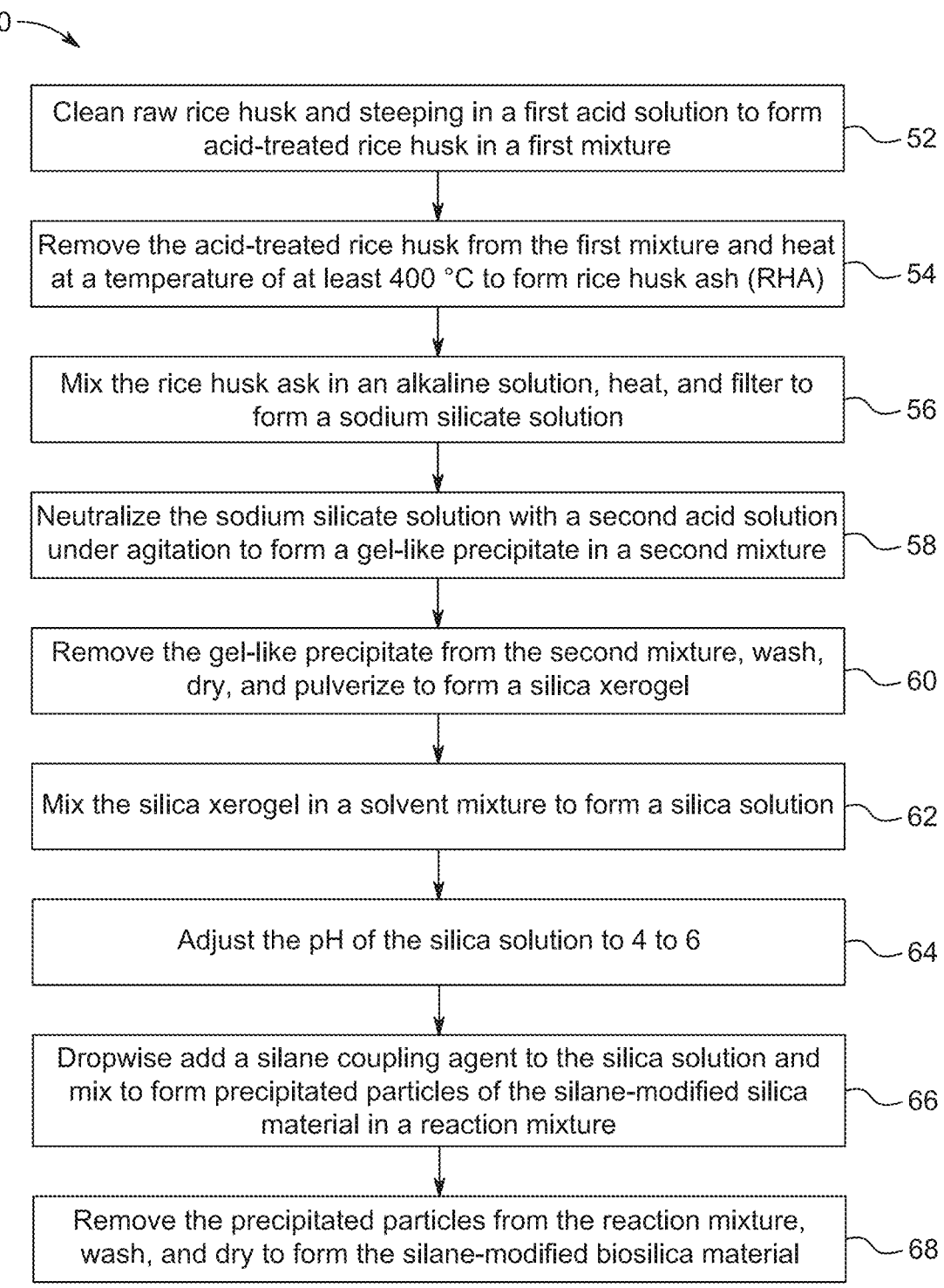

Clean raw rice husk and steeping in a first acid solution to form acid-treated rice husk in a first mixture — 52

Remove the acid-treated rice husk from the first mixture and heat at a temperature of at least 400 °C to form rice husk ash (RHA) — 54

Mix the rice husk ask in an alkaline solution, heat, and filter to form a sodium silicate solution — 56

Neutralize the sodium silicate solution with a second acid solution under agitation to form a gel-like precipitate in a second mixture — 58

Remove the gel-like precipitate from the second mixture, wash, dry, and pulverize to form a silica xerogel — 60

Mix the silica xerogel in a solvent mixture to form a silica solution — 62

Adjust the pH of the silica solution to 4 to 6 — 64

Dropwise add a silane coupling agent to the silica solution and mix to form precipitated particles of the silane-modified silica material in a reaction mixture — 66

Remove the precipitated particles from the reaction mixture, wash, and dry to form the silane-modified biosilica material — 68

| Mix an epoxy resin and a silane-modified biosilica material and sonicate to form a mixture | ⟋102 |

| Add at least one polyamine to the mixture to form a curable composition | ⟋104 |

| Cure the curable composition by mixing thereby allowing the epoxy resin, the silane-modified biosilica material, and the at least one polyamine to react and form the composite material | ⟋106 |

CURABLE COMPOSITION CONTAINING RICE HUSK ASH BIOSILICA TOUGHENED EPOXY RESIN

STATEMENT REGARDING PRIOR DISCLOSURE BY THE INVENTORS

Aspects of this technology are described in "Thermal, mechanical and barrier properties of rice husk ash biosilica toughened epoxy biocomposite coating for structural application" published in Progress in Organic Coatings, August 2022, which is incorporated herein by reference in its entirety.

STATEMENT OF ACKNOWLEDGEMENT

This research was supported by the Deanship of Scientific Research at Najran University under the project NU/RC/SERC/11/4.

BACKGROUND

Technical Field

The present disclosure is directed to a curable composition, particularly to a curable composition including an epoxy resin toughened with a silane-modified biosilica material derived from rice husk.

Description of Related Art

The "background" description provided herein is to present the context of the disclosure generally. Work of the presently named inventors, to the extent it is described in this background section, as well as aspects of the description that may not otherwise qualify as prior art at the time of filing, are neither expressly nor impliedly admitted as prior art against the present invention.

The expansion of composite applications can be attributed to several factors, with the primary driver being the superior strength and lightweight nature of composite-fabricated items. As a result, composite materials have gained significant prominence in various engineering applications today. This evolving landscape presents numerous new requirements and opportunities, which can only be realized through advancements in novel materials and their corresponding production technologies. The demand for composite materials with improved thermal properties and other desirable qualities, such as enhanced mechanical performance, a wide operating temperature range, and appropriate chemical resistance, is on the rise. Furthermore, environmental and sustainability concerns have stimulated efforts to develop bio-based composite materials as an alternative to synthetic composites across various end-use application areas. However, it should be noted that biocomposite materials are not without challenges and limitations. These include issues such as poor moisture resistance (hydrophilicity), low thermal stability, flammability, poor machinability, and highly anisotropic characteristics.

Biocomposite coatings can enhance the thermal stability, mechanical toughness, hydrophobicity, and non-reactivity of biocomposites to environmental conditions and different gases. Epoxy resins may be suitable for structural applications, due to their mechanical properties, such as minimal shrinkage during curing, low residual stresses, and outstanding heat and chemical resistance. Additionally, epoxy resins are available in various formulations, making them ideal for a wide range of applications, including adhesives, coatings, and composite materials.

Epoxy resins, similar to most polymers, possess non-conductive electrical properties and exhibit low thermal conductivity. Their mechanical characteristics stem from a highly cross-linked network, but this also makes them brittle materials with moderate fracture toughness compared to other polymers. Extensive efforts have been made to mitigate these drawbacks thus far. However, the utilization of commercial fillers increases the cost of the final product and necessitates stringent process control.

Bio-derived ceramics prepared from peanut hull, orange peel, sea urchin, rice husk (biosilica), wheat husk, and clay are widely used as particulate reinforcements in high-temperature composite coatings for a variety of technical uses. These bio-derived micro or nanofillers exhibit qualities comparable to the synthetic fillers while maintaining a high level of environmental safety and biocompatibility. Generally, these bio-fillers are derived from agricultural wastes associated with food preparation and animal and marine waste. Certain bio-fillers are derived from plants, fruit peels, and edible products. The use of these fillers has no detrimental impact on the environment and transforms polymeric materials into biocompatible forms. The recycling of agricultural waste into valuable bioceramics presents a significant opportunity to reduce solid waste accumulation, mitigate environmental harm, enhance process efficiency, and support solid waste management practices. Biosilica exhibits desirable characteristics such as high moisture absorption, enhanced wear resistance, reinforcement of the polymer matrix, excellent heat stability, and favorable time-dependent behavior, making biosilica a more suitable choice for reinforcing various applications.

Onuegbu et al. demonstrated an enhancement in the mechanical properties of polypropylene filled with various-size particles of snails' shell powder [Genevive C. Onuegbu, Isaac O. Igwe, The effects of filler contents and particle sizes on the mechanical and end-use properties of snail shell powder filled polypropylene, Mater. Sci. Appl. 2 (2011) 07]. However, the addition of particles makes the composite material more brittle due to particle amalgamation, creating the clustering effect. Julyes et al. showed that the silane-modified iron (III) oxide particles improved the mechanical and thermal stability of the epoxy composite [S. Julyes Jaisingh, V. Selvam, M. Kumar, K. Thyagarajan, Thermo-mechanical properties of unsaturated polyester toughened epoxy siliconized iron (III) oxide nanocomposites, Indian J. Eng. Mater. Sci. 21 (2014)].

Although bio-based silica materials have been employed in the production of composite materials, many of these composites still face certain limitations, including brittleness and particle amalgamation. Hence there is a need to develop novel bio-based silica material that overcomes the limitations of the art. Accordingly, it is one objective of the present disclosure is to develop a curable composition containing epoxy resin toughened with silane-modified biosilica, which enhances the mechanical, and thermal properties of the epoxy composite. A second objective of the present disclosure is to provide a method of making a composite material from this curable composition. A third objective of the present disclosure is to provide a method of making a silane-modified biosilica material from rice husk.

SUMMARY

In an exemplary embodiment, a curable composition is described. The curable composition includes at least one polyamine; an epoxy resin; and a silane-modified biosilica material. In some embodiments, the silane-modified biosilica material is derived from rice husk. In some embodiments, the silane-modified biosilica material is present in the curable composition at a concentration of 0.01 to 10 wt. %, based on a total weight of the curable composition. In some embodiments, the silane-modified biosilica material has an average particle size of 1 to 10 micrometers (μm).

In some embodiments, the at least one polyamine includes polyalkylene polyamine, and wherein the polyalkylene polyamine comprises at least one polyamine selected from the group consisting of piperazine, aminoethylpiperazine, ethylenediamine, ethyleneimine, diethylenetriamine (DETA), pentaethylenehexamine (PEHA), hexaethyleneheptamine (HEHA), tetraethylenepentamine (TEPA), triethylenetetramine (TETA), and a mixture thereof.

In some embodiments, the epoxy resin includes at least one resin selected from the group consisting of a bisphenol A epoxy resin, a bisphenol F epoxy resin, a novolak epoxy resin, an aliphatic epoxy resin, a glycidylamine epoxy resin, an epoxidized vegetable oil, and a mixture thereof.

In some embodiments, the epoxy resin is a bisphenol A epoxy resin. In some embodiments, the bisphenol A epoxy resin is bisphenol A diglycidyl ether.

In some embodiments, a volume ratio of the at least one polyamine to the epoxy resin is in a range of 20:1 to 1:1.

In some embodiments, the silane-modified biosilica material particles are uniformly distributed throughout the curable composition. In some embodiments, the silane-modified biosilica material particles have an average particle size of 3 to 7 μm.

In an exemplary embodiment, a method of making a cured composite material is described. The method includes mixing an epoxy resin and a silane-modified biosilica material, and sonicating to form a mixture; adding at least one polyamine to the mixture to form the curable composition; and curing the curable composition by mixing thereby allowing the epoxy resin, the silane-modified biosilica material, and the at least one polyamine to react and form the cured composite material. In some embodiments, the silane-modified biosilica material is present in the curable composition at a concentration of 0.2 to 5 wt. %, based on a total weight of the curable composition. In some embodiments, a volume ratio of at least one polyamine to the epoxy resin is in a range of 15:1 to 5:1.

In some embodiments, the cured composite material has a tensile strength of 50 to 90 MegaPascal (MPa) according to ASTM D-638 standard test method.

In some embodiments, the cured composite material has a flexural strength of 60 to 120 MPa according to ASTM D-790 standard test method.

In some embodiments, the cured composite material has a hardness of 80 to 130 shore-D according to ASTM D-2240 standard test method.

In some embodiments, the cured composite material has a water vapor permeability of 2 to 4 water content (WC %) according to ASTM F1249-90 standard test method.

In some embodiments, the cured composite material has an oxygen permeability of 2 to 3.5 cubic millimeters per square meters per day per atmospheres ($10^{-2}$ cc·mm/ ($m^2$·d·atm)) according to ASTM D-3985 standard test method.

In some embodiments, the cured composite material has a thermal conductivity of 0.2 to 0.5 Watts per meter-Kelvin (W/mK) as determined by TGA.

In an exemplary embodiment, a method of preparing the silicon-modified biosilica material is described. The method includes preparing the silane-modified biosilica material from rice husk by cleaning raw rice husk and steeping in a first acid solution to form acid-treated rice husk in a first mixture; removing the acid-treated rice husk from the first mixture and heating at a temperature of at least 400° C. to form rice husk ash (RHA); mixing the rice husk ask in an alkaline solution, heating, and filtering to form a sodium silicate solution; neutralizing the sodium silicate solution with a second acid solution under agitation to form a gel-like precipitate in a second mixture; removing the gel-like precipitate from the second mixture, washing, drying and pulverizing to form a silica xerogel; mixing the silica xerogel in a solvent mixture to form a silica solution; adjusting the pH of the silica solution to 4 to 6; dropwise adding a silane coupling agent to the silica solution and mixing to form precipitated particles of the silane-modified silica material in a reaction mixture; and removing the precipitated particles from the reaction mixture, washing, and drying to form the silane-modified biosilica material.

In some embodiments, the first acid solution includes at least one acid selected from the group consisting of a hydrochloric acid, a sulfuric acid, a nitric acid, a phosphoric acid, and a citric acid.

In some embodiments, the alkaline solution includes sodium hydroxide, sodium carbonate, potassium hydroxide, potassium carbonate, lithium hydroxide, and lithium carbonate.

In some embodiments, the second acid solution includes at least one acid selected from the group consisting of a hydrochloric acid, a sulfuric acid, a nitric acid, a phosphoric acid, and a citric acid.

In some embodiments, the solvent mixture includes at least two solvents selected from the group consisting of a ketone solvent, an ester solvent, an alcohol solvent, an amide solvent, an ether solvent, and water.

In some embodiments, the solvent mixture comprises an alcohol solvent and water, and wherein a volume ratio of the alcohol solvent and water is in a range of 50:1 to 10:1.

In some embodiments, the silane coupling agent is an amino-silane coupling agent selected from the group consisting of N-(2-aminoethyl)-3-aminopropyltrimethoxysilane, (aminoethylaminomethyl) phenyltrimethoxysilane, N-(2-aminoethyl)-3-aminopropyl tris(2-ethylhexoxy) silane, 3-aminopropyltriethoxysilane, trimethoxysilylpropyldiethylenetriamine, bis(2-hydroxyethyl)-3-aminopropyltrimethoxysilane, aminopropyltriethoxysilane, and 4-aminobutyltriethoxysilane.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 1A is a flowchart depicting a method of making a silane-modified biosilica material, according to certain embodiments;

DETAILED DESCRIPTION

Figure 1B:
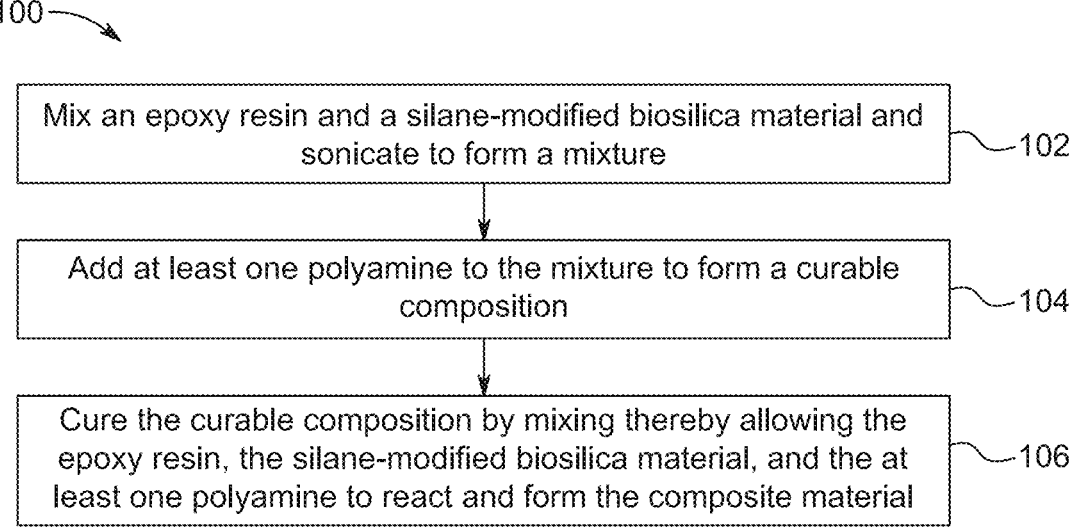
FIG. 1B is a flowchart depicting a method of making a cured composite material, according to certain embodiments.

In the drawings, reference numerals designate identical or corresponding parts throughout the several views. Further, as used herein, the words "a," "an," and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of the present disclosure are directed to a curable composition, including epoxy resin toughened with silane-modified biosilica particles derived from rice husk. The curable composition was then characterized using ASTM standards to evaluate the effects of the addition of the biosilica particles in the curable composition.

A curable composition is described. The curable composition, also referred to as a composition, includes at least one polyamine, an epoxy resin, and a silane-modified biosilica material. The polyamine may be used as a curing agent-its primary purpose is to cure, harden, and/or crosslink the epoxy resin with the silane-modified biosilica material. In an embodiment, the polyamine is polyalkylene polyamine. In a further embodiment, the polyalkylene polyamine includes at least one polyamine selected from piperazine, aminoethylpiperazine, ethylenediamine, ethyleneimine, diethylenetriamine (DETA), pentaethylenehexamine (PEHA), hexaethyleneheptamine (HEHA), tetraethylenepentamine (TEPA), triethylenetetramine (TETA), and a mixture thereof. In an embodiment, the curing composition may include other amines such as higher polyethylene amines, aminoethylpiperazine, meta-xylylene diamine, the various isomers of diamine-cyclohexane, isophorone diamine, 3,3'-dimethyl-4, 4'-diaminodicyclohexyl methane, 4,4'-diaminodicyclohexyl methane, 2,4'-diaminodicyclohexyl methane, the mixture of methylene bridged poly(cyclohexyl-aromatic)amines (MBPCAA), 1,2-propylene diamine, 1,3-propylene diamine, 1,4-butanediamine, 1,5-pentanediamine, 1,3-pentanediamine, 1,6-hexanediamine, 3,3,5-trimethyl-1,6-hexane-diamine, 3,5,5-trimethyl-1,6-hexanediamine, 2-methyl-1,5-pentanediamine, bis-(3-amino-propyl)amine, N,N'-bis-(3-aminopropyl)-1,2-ethanediamine, N-(3-amino-propyl)-1,2-ethanediamine, 1,2-diaminocyclohexane, 1,3-diaminocyclohexane, 1,4-diamino-cyclohexane, the poly(alkylene oxide) diamines and triamines (for example: Jeffamine D-230, Jeffamine D-400, Jeffamine D-2000, Jeffamine D-4000, Jeffamine T-403, Jeffamine EDR-148, Jeffamine EDR-192, Jeffamine C-346, Jeffamine ED-600, Jeffamine ED-900, Jeffamine ED-2001, and aminopropylated ethylene glycols. In a preferred embodiment, the polyamine is triethylenetetramine.

The curable composition further includes an epoxy resin, which serves as a matrix in the composition. The epoxy resin includes at least one resin selected from the group consisting of a bisphenol A epoxy resin, a bisphenol F epoxy resin, a novolak epoxy resin, an aliphatic epoxy resin, a glycidylamine epoxy resin, an epoxidized vegetable oil, and a mixture thereof. Certain other examples of epoxy resin include, dicyclopentadiene-phenol resins, phenol-aralkyl resins, and terpene-phenol resins; as well as polyphenolic resins obtainable by condensation of the above-mentioned various phenols and various aldehydes such as hydroxybenzaldehyde and crotonaldehyde, glyoxal; acid anhydrides such as methyltetrahydrophthalic anhydride, hexahydrophthalic anhydride, pyromellitic anhydride, and methylnadic anhydride; and amines such as diethylenetriamine, isophoronediamine, diaminodiphenylmethane and diaminodiphenylsulfone. In a preferred embodiment, the epoxy resin is a bisphenol A epoxy resin. The bisphenol A epoxy resin is bisphenol A diglycidyl ether. In some embodiments, a volume ratio of at least one polyamine to the epoxy resin is in a range of 20:1 to 1:1, preferably 18:1 to 3:1, preferably 15:1 to 5:1, preferably 13:1 to 7:1, preferably 11:1 to 9:1, or even more preferably about 10:1. Other ranges are also possible.

The curable composition further includes a silane-modified biosilica material. The silane-modified biosilica material is derived from rice husk. Rice husk is an agricultural waste generated from milling paddy and is used as a reinforcing material in the cured composite material prepared from the curable composition of the present disclosure. In some embodiments, the rice husk consists of cellulose in a range of 40 to 50 wt. %, preferably 42 to 48 wt. %, or even more preferably 44 to 46 wt. %; lignin in a range of 25 to 30 wt. %, preferably 26 to 29 wt. %, or even more preferably 27 to 28 wt. %; ash in a range of 15 to 20 wt. %, preferably 16 to 19 wt. %, or even more preferably 17 to 18 wt. %; and moisture in a range of 8-15 wt. %, preferably 10 to 13 wt. %, or even more preferably about 11 wt. %, each wt. % based on a total weight of the rice husk. Other ranges are also possible. It has high heat-resistant properties, and is mostly used in ash form due to the high silica content present in it. When the rice husk is converted into the ash form, it contains about 84 to 91% amorphous silica, preferably 85 to 90 wt. %, or even more preferably 86 to 89 wt. % amorphous silica, each wt. % based on a total weight of the rice husk ash. Other ranges are also possible.

In some embodiments, the silane-modified biosilica material may be prepared by obtaining biosilica material from rice husk; and surface modification of the biosilica via the aqueous solution method, to obtain the silane-modified biosilica material. The surface modification is to address the uneven distribution of the biosilica particles in the curable composition. The biosilica particles are polar particles due to the presence of polar functional groups Si—OH on its surfaces, and thus may not be compatible with the epoxy resin, which is hydrophobic. Hence, the biosilica particles surface-modified by silane treatment may improve the dispersion properties of the biosilica particles in the curable composition. The silane-modified biosilica material particles thus produced are uniformly distributed throughout the curable composition. In an embodiment, the silane-modified biosilica material is present in the curable composition at a concentration of 0.01 to 10 wt. %, based on the total weight of the curable composition, preferably 0.1 to 9 wt. %, preferably 1 to 8 wt. %, preferably 2 to 7 wt. %, or even more preferably 3 to 6 wt. %, based on the total weight of the curable composition. Referring to FIGS. 4A to 4D, the silane-modified biosilica material particles have a three-dimensional shape, which can be a polyhedral particle shape. Suitable polyhedral particle shapes can include but are not limited to, tetrahedrons, pentahedrons, hexahedrons, heptahedrons, octahedrons, nonahedron, decahedrons, and a combination thereof. In some embodiments, the silane-modified biosilica material has an average particle size of 1 to 10 micrometers (μm), preferably 2 to 8 μm, and more preferably 3 to 7 μm. Other ranges are also possible.

The curable compositions of the present disclosure may optionally include one or more additives, such as plasticizers, solvents, viscosity regulators, reactive diluents, flexibility-imparting agents, fillers, cure accelerators, coloring agents, and other modifiers. Suitable examples of cure accelerators include imidazoles such as 2-methyl imidazole and 2-ethyl-4-methyl imidazole; amines such as 2,4,6-tris (dimethylaminomethyl) phenol and benzyldimethylamine; and organic phosphorus compounds, such as tributylphosphine, triphenylphosphine and tris(dimethoxyphenyl)phosphine. Suitable examples of fillers include fused silica, crystalline silica, glass powder, alumina, calcium carbonate, barium sulfate, barium titanate, talc, clay, magnesium carbonate, aluminum oxide, aluminum hydroxide, magnesium hydroxide, and mica. Suitable examples of flame retardants include antimony trioxide and phosphoric acid. The curable composition of the present disclosure is used as or in adhesives, paints, molding materials, casting materials, and encapsulating materials, for lamination purposes as a binder for glass fibers, carbon fibers, alumina fibers, etc. In some embodiments, accelerators may be present in the curable composition at a concentration of 0.01 to 5 wt. %, preferably 0.1 to 3 wt. %, or even more preferably 0.5 to 1.5 wt. %, each wt. % based on a total weight of the curable composition. In some further embodiments, fillers may be present in the curable composition at a concentration of 0.01 to 5 wt. %, preferably 0.1 to 3 wt. %, or even more preferably 0.5 to 1.5 wt. %, each wt. % based on a total weight of the curable composition. In some preferred embodiments, flame retardants may be present in the curable composition at a concentration of 0.01 to 5 wt. %, preferably 0.1 to 3 wt. %, or even more preferably 0.5 to 1.5 wt. %, each wt. % based on a total weight of the curable composition. Other ranges are also possible.

FIG. 1A illustrates a flow chart of a method 50 of making a silane-modified biosilica material from rice husk. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

Figure 2A:
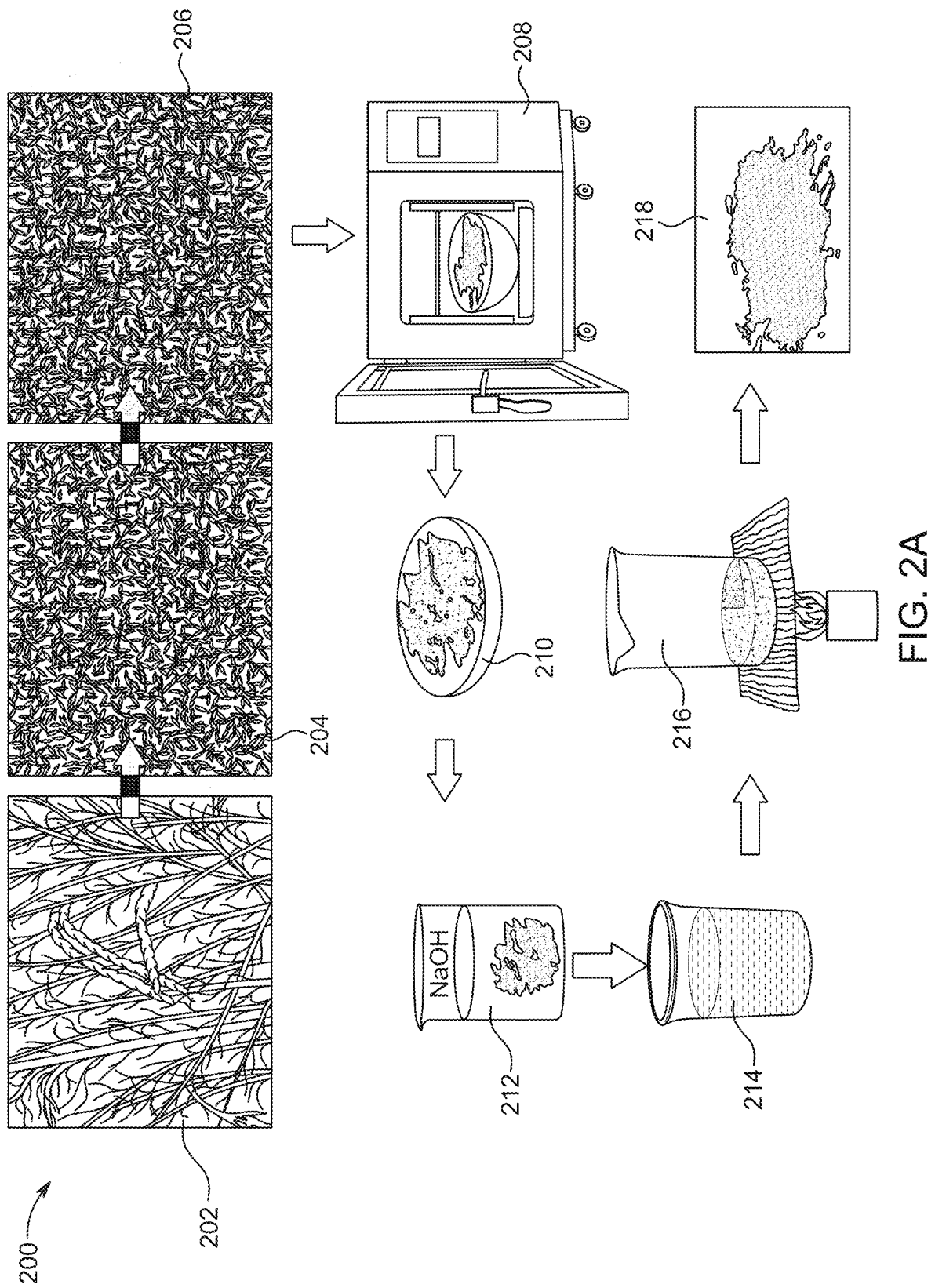
FIG. 2A is a schematic illustration depicting a process of extraction of biosilica from rice husk, according to certain embodiments.

At step 52, the method 50 includes cleaning raw rice husk (202) and steeping in a first acid solution to form acid-treated rice husk in a first mixture, as depicted in FIG. 2A. The raw rice husk (202) may be cleaned several times until all the impurities, such as rice leaves, sand, gravel, etc., are removed. In some embodiments, the raw rice husk is first be cleaned with normal water (204), followed by rinsing with distilled water to ensure all the impurities are completely removed, as depicted in FIG. 2A. After cleaning, the raw rice husk (202) is further immersed in a first acid solution (206). Suitable examples of the first acid solution include hydrochloric acid, sulfuric acid, nitric acid, phosphoric acid, citric acid, etc. In an embodiment, the first acid is hydrochloric acid. The first acid has a concentration in a range of 1-2 normality (N), preferably about 1.5 N, or even more preferably about 1.0 N. In an embodiment, the raw rice husk is immersed in the first acid for a period of 3-6 hours (h), preferably 4-5 h, preferably 4 h to form the acid-treated rice husk. Other ranges are also possible.

At step 54, the method 50 includes removing the acid-treated rice husk from the first mixture and heating at a temperature of at least 400° C. to form rice husk ash (RHA) (210), as depicted in FIG. 2A. In some embodiments, the heating may be carried out in a furnace such as a tube furnace, for example, in a ceramic crucible (e.g., an alumina crucible) or other forms of containment, and heating to the temperatures described above. In an embodiment, the acid-treated rice husk ash is heated to a temperature range of 400-1400° C., preferably 450-1000° C., preferably 475-900° C., preferably 500-800° C., preferably 500-600° C., and more preferably at 500° C. to form the rice husk ash. The RHA is devoid of most of the metallic impurities, and organic matter such as hemicellulose, cellulose, and lignin. The RHA (210) thus formed has a high percentage of silica content. In an embodiment, the silica content may be in a range of 65-99.5%, preferably 70-99%, preferably 75-90%, and preferably 80-85%, each % based on a total weight of the RHA (210). The silica in the RHA (210) may be amorphous or crystalline in nature. In a preferred embodiment, the silica is amorphous in nature. In a preferred embodiment, the first acid is hydrochloric acid (1.5N); immersion time is 4 hours, and the heating temperature is 500° C. to form the RHA (210) with high silica content.

At step 56, the method 50 includes mixing the rice husk ash in an alkaline solution (212), heating, and filtering to form a sodium silicate solution, as depicted in FIG. 2A. Suitable examples of the alkaline solution include sodium hydroxide, sodium carbonate, potassium hydroxide, potassium carbonate, lithium hydroxide, and lithium carbonate. In some preferred embodiments, the alkaline solution is sodium hydroxide. In some further preferred embodiments, the silica in the RHA reacts in the presence of an alkaline solution, like sodium hydroxide, forming sodium silicate. This reaction (214) is carried out at a temperature range of 80-120° C., preferably 85-115° C., preferably 90-110° C., preferably 95-100° C. for a period of 2-6 hours, preferably 3-5 hours, preferably 4 hours, as depicted in FIG. 2A. In some embodiments, this reaction is carried out at a temperature range of 180-200° C. at a pressure ranging from 6-8 atmosphere, if the acid-treated rice husk is not heated to about 500° C. Other ranges are also possible.

At step 58, the method 50 includes neutralizing the sodium silicate solution with a second acid solution under agitation to form a gel-like precipitate in a second mixture, as depicted in FIG. 2A. From the reaction of sodium silicate with the second acid solution, the silica is precipitated. This reaction is carried out under vigorous agitation, by means of an agitator (for example, a stirrer), to ensure the formation of the precipitate and to prevent the reaction between sodium silicate with water to produce various hydrated forms of silica. The hydrated forms of silica tend to polymerize to form a silicic acid gel. Suitable examples of the second acid solution include hydrochloric acid, sulfuric acid, nitric acid, phosphoric acid, and citric acid. In a preferred embodiment, the second acid is sulfuric acid. In a more preferred embodiment, the second acid has a concentration in a range of about 5% to 50%, preferably 10%, by weight. The pH is maintained between 6-8, preferably 7. In an embodiment, the agitation is carried out for 100-400 hours, preferably 125-375 hours, preferably 150-350 hours, preferably 200-350 hours, preferably 350 hours to form the precipitated silica. Other ranges are also possible.

At step 60, the method 50 includes removing the gel-like precipitate from the second mixture, washing, drying, and pulverizing to form a silica xerogel, as depicted in FIG. 2A. In some embodiments, the precipitated silica is removed from the second mixture by filtration. The filtered silica is further washed with water to remove any impurities/sodium sulfate; and then dried at a temperature range of 60-100° C., preferably 65-80° C., preferably 70-75° C. for 15-30 hours, preferably 18-25 hours, preferably 20 hours to form the silica xerogel. Upon drying, the silica xerogel was pulverized using a ball milling technique, or a mortar and pestle/ spray drying, to obtain the silica xerogel. The silica xerogel (216) contains the biosilica particles in the form of fine particles (218), as depicted in FIG. 2A. In some embodiments, the fine particles of the biosilica (218) have a particle size in a range of 1 to 50 μm, preferably 5 to 40 μm, preferably 10 to 30 μm, or even more preferably about 20 μm. Other ranges are also possible.

Surface treatment is carried out to improve the dispersion properties of the biosilica particles in the curable composition.

At step 62, the method 50 includes mixing the silica xerogel in a solvent mixture to form a silica solution. In some embodiments, the solvent mixture includes at least two solvents selected from the group consisting of a ketone solvent (for example: acetone, methyl ethyl ketone, and methyl isobutyl ketone), an ester solvent, an alcohol solvent (for example: methanol, ethanol, isopropanol), an amide solvent, an ether solvent (for example: dioxane and ethyleneglycol dimethylether or glycol ethers, such as ethyleneglycol monomethylether, ethyleneglycol monoethylether, and propyleneglycol monomethylether), and water. In an embodiment, the solvent mixture includes an alcohol solvent and water. In a preferred embodiment, the alcohol solvent is ethanol. The volume ratio of the alcohol solvent and water is in a range of 50:1 to 10:1, preferably 40:1 to 20:1, preferably 25:1 to 20:1, preferably about 19:1. Other ranges are also possible.

At step 64, the method 50 includes adjusting the pH of the silica solution to 4 to 6. In an embodiment, the pH of the silica solution was adjusted between 4.5-5.5. Other ranges are also possible.

Figure 2B:
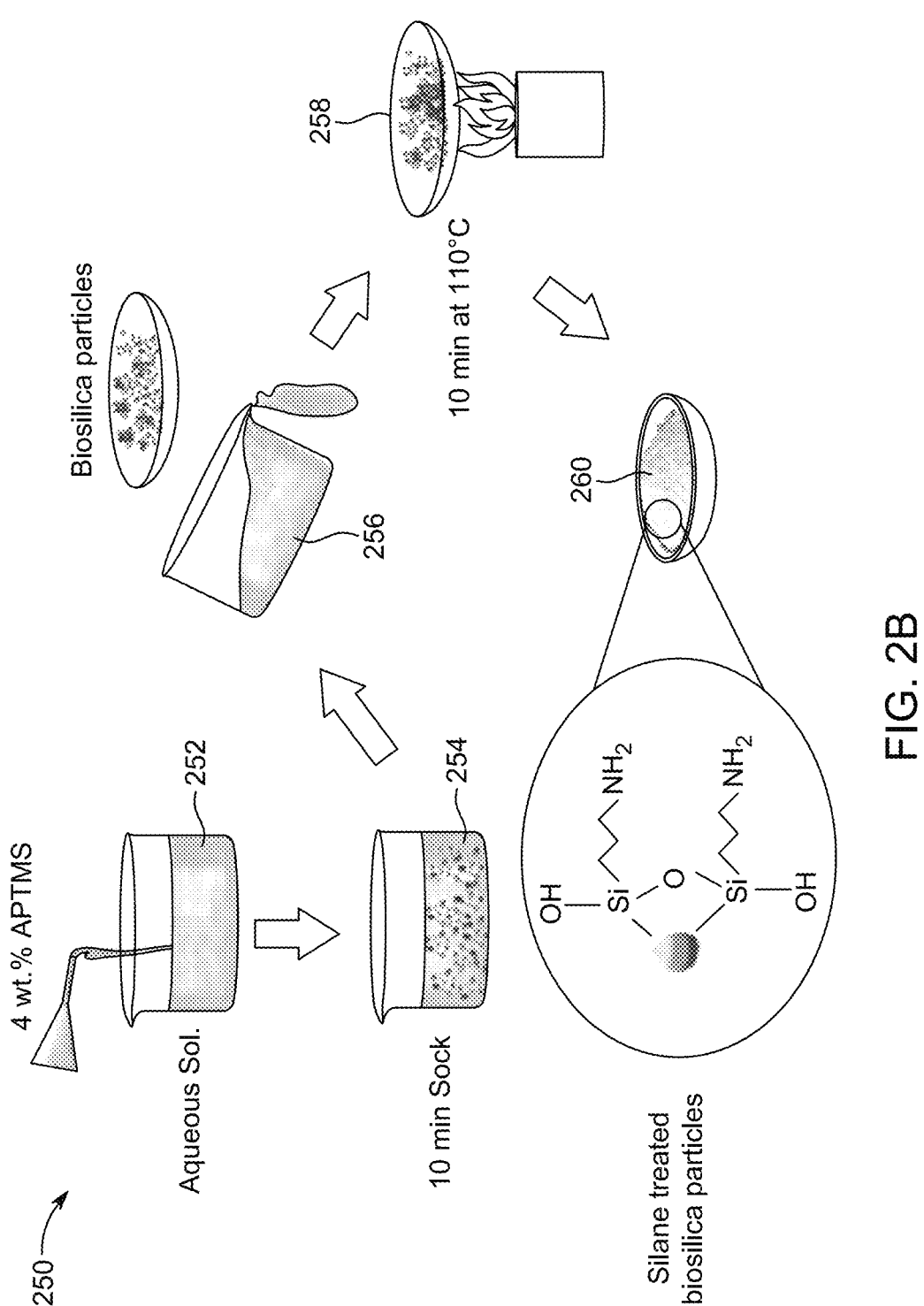
FIG. 2B is a schematic illustration depicting a process of silane treatment on biosilica particles, according to certain embodiments.

At step 66, the method 50 includes dropwise adding a silane coupling agent to the silica solution and mixing to form precipitated particles of the silane-modified silica material (250) in a reaction mixture, as depicted in FIG. 2B. The silane coupling agent is an amino-silane coupling agent (252) selected from N-(2-aminoethyl)-3-aminopropyltrimethoxysilane, (aminoethylaminomethyl)phenyltrimethoxy silane, N-(2-aminoethyl)-3-aminopropyl tris(2- ethylhexoxy) silane, 3-aminopropyltrimethoxysilane (APTMS), trimethoxysilylpropyldiethylene triamine, bis(2-hydroxyethyl)-3-aminopropyl trimethoxysilane, 3-amino-propyltriethoxysilane, aminopropyltriethoxysilane, and 4-aminobutyltriethoxysilane. In a preferred embodiment, the silane couple agent (252) is APTMS, as depicted in FIG. 2B. The concentration of the silane coupling agent (252) in the silica solution is in a range of 1-5 wt. %, preferably 2-4 wt. %, and more preferably about 2 wt. % based on a total weight of the silica solution. In some embodiments, the silane coupling agent is mixed in the silica solution for a period of 1-30 minutes, preferably 2-20 minutes, preferably 3-15 minutes, preferably 5-10 minutes, or even more preferably for 5 minutes to obtain the precipitated particles of the silane-modified silica material (Si—O—Si compounds). In some embodiments, the precipitated particles of the silane-modified silica material have a particle size in a range of 1 to 100 μm, preferably 5 to 80 μm, preferably 10 to 60 μm, preferably 15 to 40 μm, or even more preferably about 25 μm. Other ranges are also possible.

At step 68, the method 50 includes removing the precipitated particles from the reaction mixture, washing, and drying to form the silane-modified biosilica material. The precipitated particles are removed by filtration and further washed with an alcohol solvent (ethanol) to remove the silane coupling agent from the reaction mixture. The precipitated particles are further dried at a temperature range of 100-120° C., or even more preferably 110° C. (258), to remove moisture, as depicted in FIG. 2B. In some embodiments, the drying can be done by using heating appliances such as ovens, microwaves, autoclaves, hot plates, heating mantles and tapes, oil baths, salt baths, sand baths, air baths, hot-tube furnaces, and hot-air guns.

In some embodiments, the silane-modified biosilica material has a formula (I), in which the silane couple agent (252) is covalently bonded onto surfaces of the silica ash particles via at least one silicon atom. In some embodiments, the silane couple agent (252) comprises at least one functional group selected from the group consisting of hydroxyl group, and amino group. In some further embodiments, the surface of the silane-modified biosilica material comprises a plurality of the hydroxyl groups and amino groups.

Formula [I]

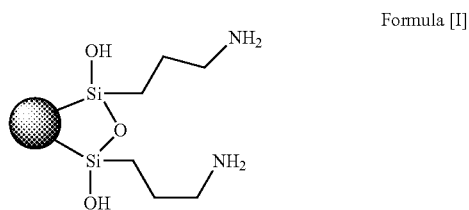

FIG. 1B illustrates a flow chart of a method 100 of making a cured composite material with the silane-modified biosilica material from rice husk. The order in which the method 100 is described is not intended to be construed as a limitation, and any number of the described method steps can be combined in any order to implement the method 100. Additionally, individual steps may be removed or skipped from the method 100 without departing from the spirit and scope of the present disclosure.

At step 102, the method 100 includes mixing an epoxy resin and a silane-modified biosilica material and sonicating to form a mixture. In some embodiments, the epoxy resin is toughened with the silane-modified biosilica material to improve its mechanical, thermal, and barrier properties. For this purpose, the epoxy resin is mixed with varying amounts of silane-modified biosilica material, particularly in a range of 0.5-4 vol. %, preferably 1-2 vol. %, or even more preferably about 1.5 vol. % based on a total volume of the mixture, to form the mixture. In an embodiment, the epoxy resin includes at least one resin selected from the group consisting of a bisphenol A epoxy resin, a bisphenol F epoxy resin, a novolak epoxy resin, an aliphatic epoxy resin, a glycidylamine epoxy resin, an epoxidized vegetable oil, and a mixture thereof. Certain other examples of the epoxy resin include polyglycidyl ethers of polyhydric phenols, for example, polyglycidyl ethers of bisphenol A, bisphenol F, bisphenol AD, catechol, and resorcinol. Epoxy compounds obtained by reacting polyhydric alcohols, such as butinediol or polyethylene glycol, or glycerin with epichlorohydrin, are also suitable. Epoxidized (poly) olefinic resins, epoxidized phenolic novolac resins, epoxidized cresol novolac resins, and cycloaliphatic epoxy resins may also be used. Urethane-modified epoxy resins are also suitable. Other suitable epoxy compounds include polyepoxy compounds based on aromatic amines and epichlorohydrin, such as N,N'-diglycidyl-aniline; N,N'-dimethyl-N,N'-diglycidyl-4,4'diaminodiphenyl methane; N,N,N',N'-tetraglycidyl-4,4'diaminodiphenyl methane; N-diglycidyl-4-aminophenyl glycidyl ether; N,N,N',N'-tetraglycidyl-1,3-propylene bis-4-aminobenzoate, and/or combinations thereof. In a preferred embodiment, the epoxy resin is a bisphenol A epoxy resin. The bisphenol A epoxy resin is bisphenol A diglycidyl ether. In some embodiments, a mixture of epoxy resins may be used to prepare the mixture. The mixture is sonicated, using an ultrasonic probe or a sonication bath, at a frequency range of 15-25 megahertz (MHz), preferably 17-23 MHz, preferably 20 MHz, for 10-30 minutes, preferably 15-25 minutes, and more preferably for 20 minutes to obtain the mixture. Other ranges are also possible.

At step 104, the method 100 includes adding at least one polyamine to the mixture to form a curable composition. The polyamine serves as the curing agent in the curable composition. The polyamines may be aliphatic, cycloaliphatic, aliphatic or aromatic amines, aminoamides, which may or may not contain imidazoline groups, and adducts thereof. In an embodiment, the polyamine is polyalkylene polyamine. The polyalkylene polyamine includes at least one polyamine selected from piperazine, aminoethylpiperazine, ethylenediamine, ethyleneimine, DETA, PEHA, HEHA, TEPA, TETA, and a mixture thereof. In a preferred embodiment, the polyamine is an aliphatic amine. In an example, the aliphatic amine is triethylenetetramine. In some preferred embodiments, the volume ratio of the at least one polyamine to the epoxy resin in the curable composition is in a range of 15:1 to 5:1, preferably 12:1 to 8:1, or even more preferably about 10:1. Other ranges are also possible. However, this ratio may be modified based on the choice of epoxy resin and the polyamine in the curable composition.

At step 106, the method 100 includes curing the curable composition by mixing thereby allowing the epoxy resin, the silane-modified biosilica material and the at least one polyamine to react and form the cured composite material. The samples were cued for 12-72 hours, preferably 24 to 60 hours, or even more preferably 36 to 48 hours, in a silicon mold to form the cured composite material. Other ranges are also possible. In some embodiments, the mold may include, but are not limited to shapes such as spherical, cylindrical, cubical, cuboidal, pentagonal, hexagonal, and rhombic. In some embodiments, the degree of polymerization is pH-dependent, and the polymerization rate can be controlled by adjusting the curing agent and pH. In some embodiments, at least 50% of the epoxy monomers are polymerized to form the polyamine epoxy, preferably at least 60%, preferably at least 70%, preferably at least 80%, preferably at least 90%, or even more preferably at least 95% of the epoxy monomers are polymerized to form the polyamine epoxy. In some further embodiments, at least 50% of the polyamine monomers are polymerized to form the polyamine epoxy, preferably at least 60%, preferably at least 70%, preferably at least 80%, preferably at least 90%, or even more preferably at least 95% of the polyamine monomers are polymerized to form the polyamine epoxy. In some further embodiments, at least 50% of the silane-modified biosilica particles of formula [I] are polymerized to form the polyamine epoxy, preferably at least 60%, preferably at least 70%, preferably at least 80%, preferably at least 90%, or even more preferably at least 95% of the silane-modified biosilica particles of formula [I] are polymerized to form the polyamine epoxy. Other ranges are also possible. In some embodiments, the silane-modified biosilica particles of formula [I] may be covalently bonded to the epoxy resin monomers via the plurality of hydroxyl groups and amino groups on the surfaces of the silane-modified biosilica.

A cured composition obtained by curing the curable composition, in which the silane-modified biosilica material particles are uniformly distributed throughout the cured composition.

Figure 4A:
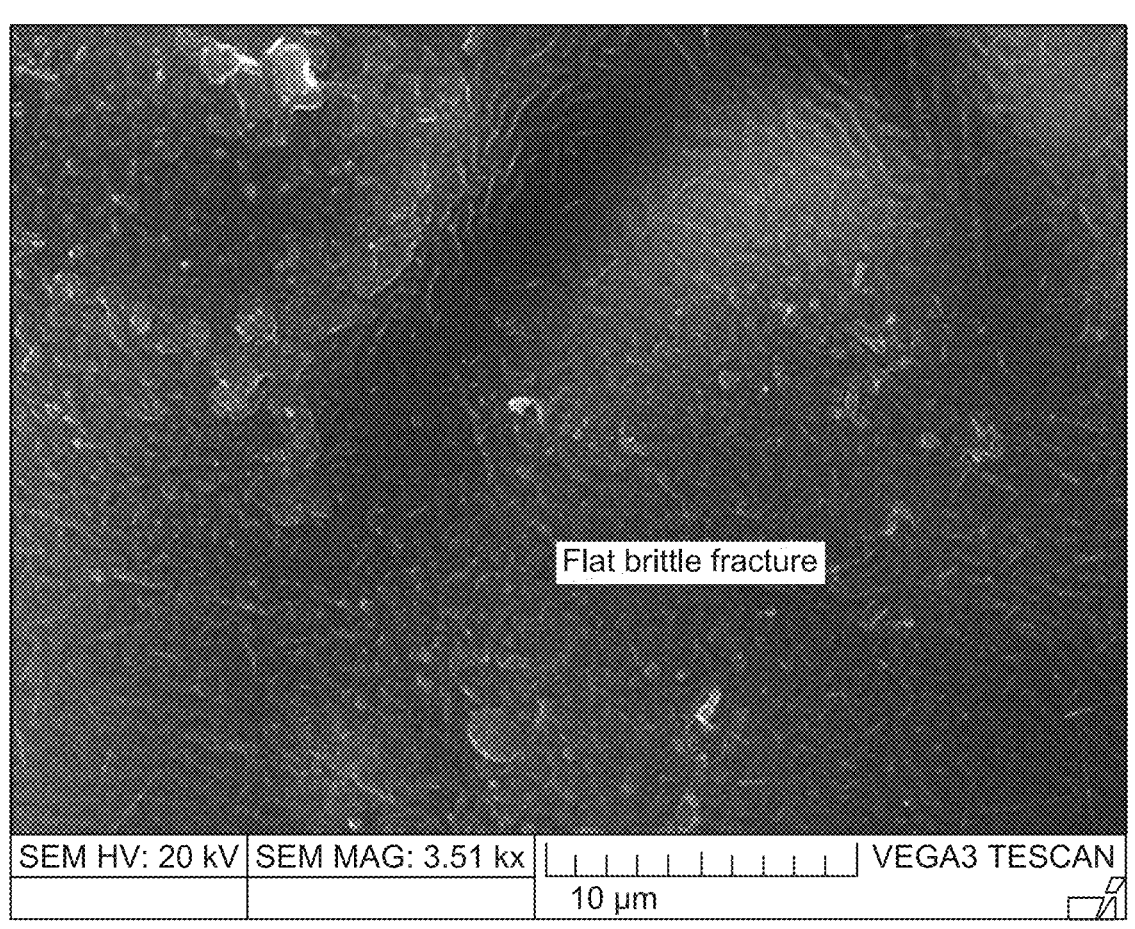
FIG. 4A depicts a scanning electron microscope (SEM) image of the cured composite material, E, according to certain embodiments.

Referring to FIG. 4A, a scanning electron microscope (SEM) image of the cured composite material (E) in the absence of the silane-modified biosilica material. The cured composite material E has a flat and smooth surface morphology. As used herein, a "smooth surface morphology" generally refers to a surface that is even, flat, and free from irregularities or roughness. In the present disclosure, the smooth surface of the cured composite material exhibits a high level of regularity, with minimal or no visible or tactile discontinuities, bumps, or protrusions.

Figure 4B:
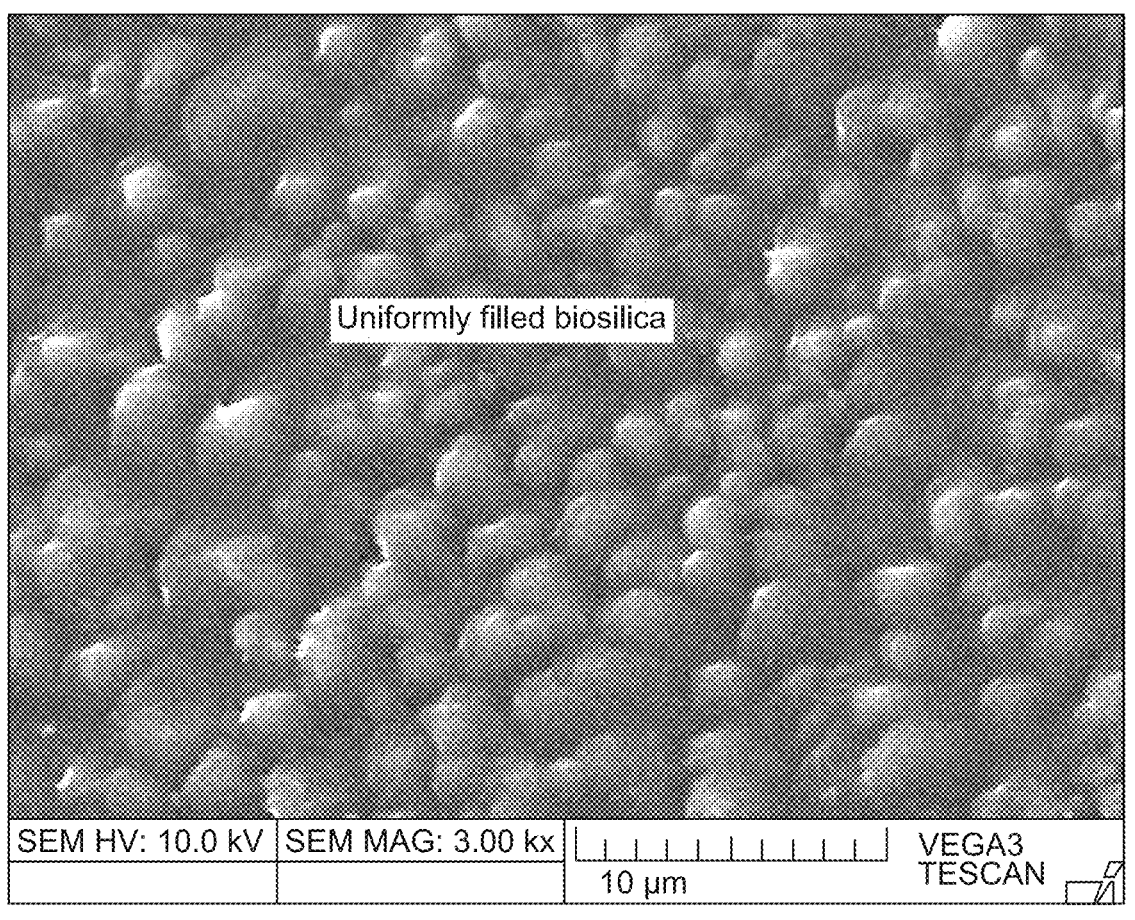
FIG. 4B shows a SEM image of the cured composite material, EB2, according to certain embodiments.
Figure 4C:
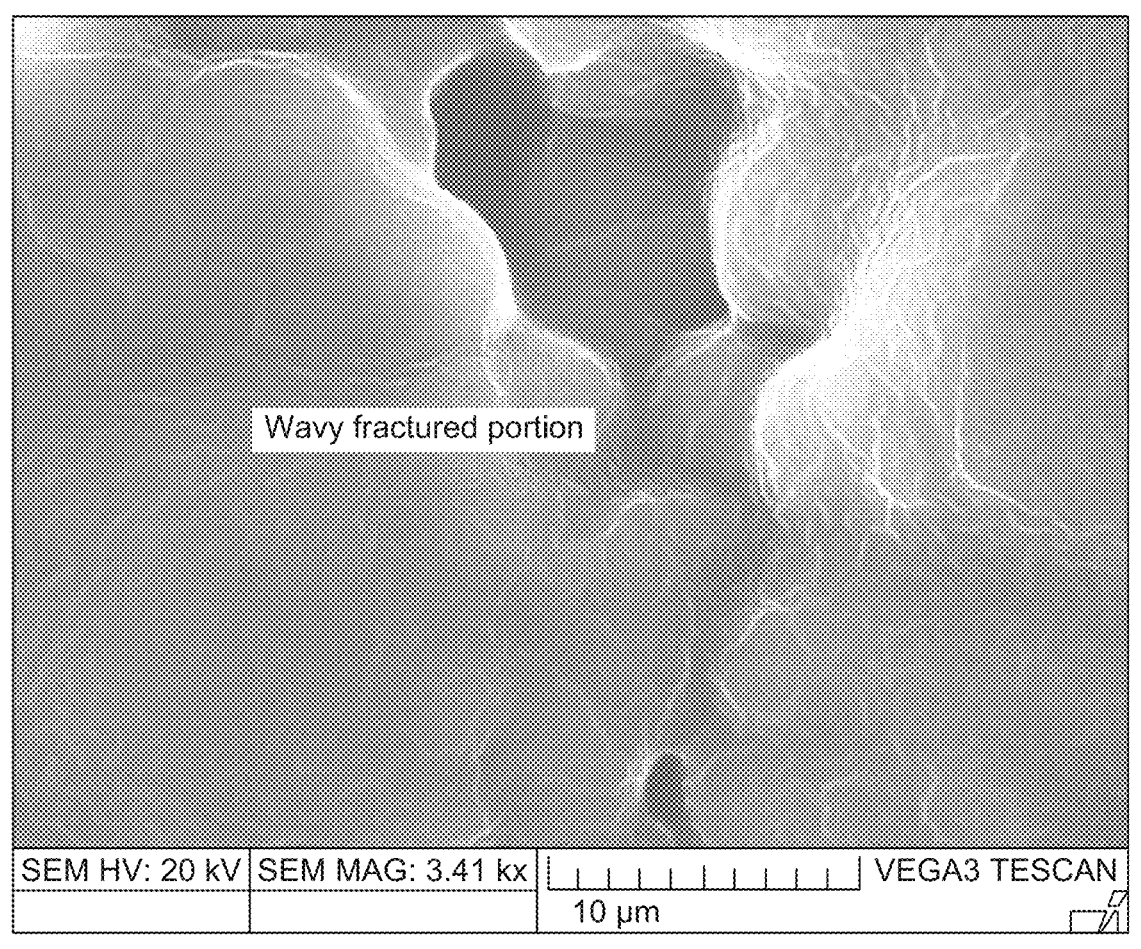
FIG. 4C shows a SEM image of the cured composite material, EB3, according to certain embodiments.

Referring to FIG. 4C, a SEM fractography image of the composite material (EB3) in the presence of the silane-modified biosilica material. The cured composite material EB3 shows a wavy structure in the fracture portion. As used herein, a "wavy structure" in the fracture portion generally refers to the presence of irregular, undulating patterns or features observed on the fractured surface of a material under examination. In the present disclosure, when a cured composite material breaks or fractures, the resulting surface can exhibit various types of fracture patterns, including flat, smooth, or irregular ones. A wavy structure specifically describes a fracture surface with repetitive and continuous wave-like formations.

Figure 4D:
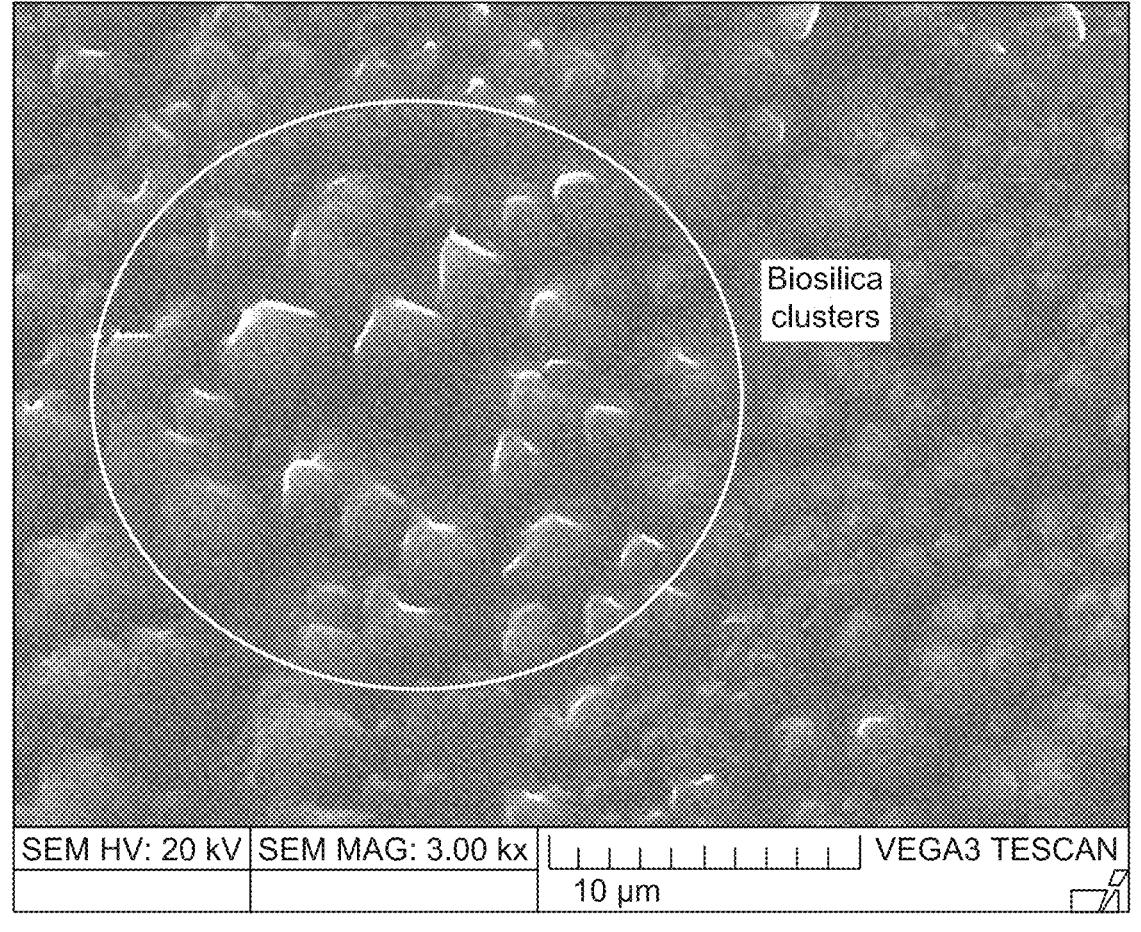
FIG. 4D shows a SEM image of the cured composite material, EB5, according to certain embodiments.

Referring to FIGS. 4B and 4D, the SEM images of the cured composite material, EB2 and EB5. The cured composite materials EB2 and EB5 show the silane-modified biosilica material particles are uniformly distributed throughout the cured composite. In some embodiments, the silane-modified biosilica material particles may be present in the the form of agglomerates and/or clusters having an average particle size of 1 to 10 $\mu$m, preferably 1.5 to 8 $\mu$m, preferably 2 to 6 $\mu$m, or even more preferably 2.5 to 4 $\mu$m. Other ranges are also possible. In some further embodiments, the cured composite material containing the silane-modified biosilica material particles may have a rough surface morphology. As used herein, the term "rough surface" or "rough surface morphology" generally refers to the physical characteristics or features of a surface that deviate from smoothness or regularity. The term "rough surface morphology" may include unevenness, irregularities, and variations in height, shape, or texture of a surface at a micro or macro scale. In the present disclosure, the rough surface morphology of the silane-modified biosilica material particles includes, but is not limited to, bumps, ridges, valleys, peaks, or irregular shapes that may be randomly distributed or organized in a specific pattern. Additionally, the surface roughness may be determined by roughness average (Ra), root mean square (RMS) roughness, or peak-to-valley height. Roughness average (Ra) is calculated by averaging the surface roughness of at least 5, and preferably at least 10, representative locations spaced approximately evenly across the portion of the article carrying the silane-modified biosilica material particles. In some embodiments, it is preferred to measure the thickness at representative points across the longest dimension of the portion of the article that is covered with the silane-modified biosilica material particles. The standard deviation of roughness is found by calculating the standard deviation of the local average roughness across at least 5, and preferably at least 10, representative locations spaced approximately evenly across the portion of the article carrying the silane-modified biosilica material particles.

In an embodiment the cured material has a rough surface with a pattern of protrusions formed for example by the clusters of biosilica material. The protrusions are concave structures extending from a base surface of the cured material. The protrusions are generally hemispherical in shape with approximately equal height and width. As shown in FIG. 4D, for example, protrusions may have height and/or width dimensions of from 1 to 30 μm, preferably 10-20 μm. The protrusions preferably occur at a density of 20-100/100 μm², preferably 30-80/100 μm², or 40-50/100 μm². Other ranges are also possible.

In some embodiments, the epoxy monomers have an equivalent weight per epoxide group of 100 to 400 g/mol, preferably 150 to 300 g/mol, or even more preferably about 195 g/mol at a temperature of about 25° C.

In some embodiments, the polyamine monomers have a molecular weight in a range of 80 to 500 g/mol, preferably about 120 to 400 g/mol, preferably 140 to 300 g/mol, or even more preferably about 160 to 200 g/mol. Other ranges are also possible.

In some embodiments, the silane-modified biosilica particles have a density in a range of 1 to 1.8 g/cm³, preferably 1.1 to 1.5 g/cm³, or even more preferably about 1.3 g/cm³. Other ranges are also possible.

In some embodiments, the cured composite material prepared by the method of the present disclosure has a tensile strength of 50 to 90 MegaPascal (MPa), preferably 60 to 80 MPa, or even more preferably about 70 MPa, according to ASTM D-638 standard test method [Standard Test Method for Tensile Properties of Plastics, ASTM D-638, which is incorporated herein by reference in its entirety].

In some embodiments, the cured composite material prepared by the method of the present disclosure has a flexural strength of 60 to 120 MPa, preferably 70 to 110 MPa, preferably 80 to 100 MPa, or even more preferably about 90 MPa, according to ASTM D-790 standard test method [Standard Test Methods for Flexural Properties of Unreinforced and Reinforced Plastics and Electrical Insulating Materials, ASTM D-790, which is incorporated herein by reference in its entirety].

In some embodiments, the cured composite material prepared by the method of the present disclosure has a hardness of 80 to 130 shore-D, preferably 90 to 120 shore-D, or even more preferably 100 to 110 shore-D, according to ASTM D-2240 standard test method [Standard Test Method for Rubber Property-Durometer Hardness, ASTM D-2240, which is incorporated herein by reference in its entirety].

In some embodiments, the cured composite material prepared by the method of the present disclosure has a water vapor permeability of 2 to 4 water content (WC %), preferably 2.5 to 3.5 WC %, or even more preferably about 3 WC %, according to ASTM F1249-90 standard test method [Standard Test Method for Water Vapor Transmission Rate Through Plastic Film and Sheeting Using a Modulated Infrared Sensor, ASTM F1249-90, which is incorporated herein by reference in its entirety].

In some embodiments, the cured composite material prepared by the method of the present disclosure has an oxygen permeability of 2 to 3.5 ($10^{-2}$ cc·mm/(m²·d·atm)), preferably 2.2 to 3.3 $10^{-2}$ cc·mm/(m²·d·atm), or even more preferably about 2.4 to 3.1 $10^{-2}$ cc·mm/(m²·d·atm), according to ASTM D-3985 standard test method [Standard Test Method for Oxygen Gas Transmission Rate Through Plastic Film and Sheeting Using a Coulometric Sensor, ASTM D-3985, which is incorporated herein by reference in its entirety].

In some embodiments, the cured composite material prepared by the method of the present disclosure has a thermal conductivity of 0.2 to 0.5 Watts per meter-Kelvin (W/mK), preferably 0.25 to 0.45 W/mK, preferably 0.3 to 0.4 W/mK, or even more preferably about 0.35 W/mK, as determined by thermogravimetric analysis (TGA). The thermostability of the composite materials were characterized by thermal gravimetric analysis (TGA). TGA analysis is performed by using a thermogravimetric analyzer (NETZSCH STA Jupiter, 409PL Luxx, Germany). For the TGA analysis, the samples are measured by heating at an increment frequency of 5 to 20° C./min, preferably about 10° C./min with the flow of nitrogen in a range of 25 to 150 mL/min, and a temperature of up to 1200° C. Other ranges are also possible.

Figure 7:
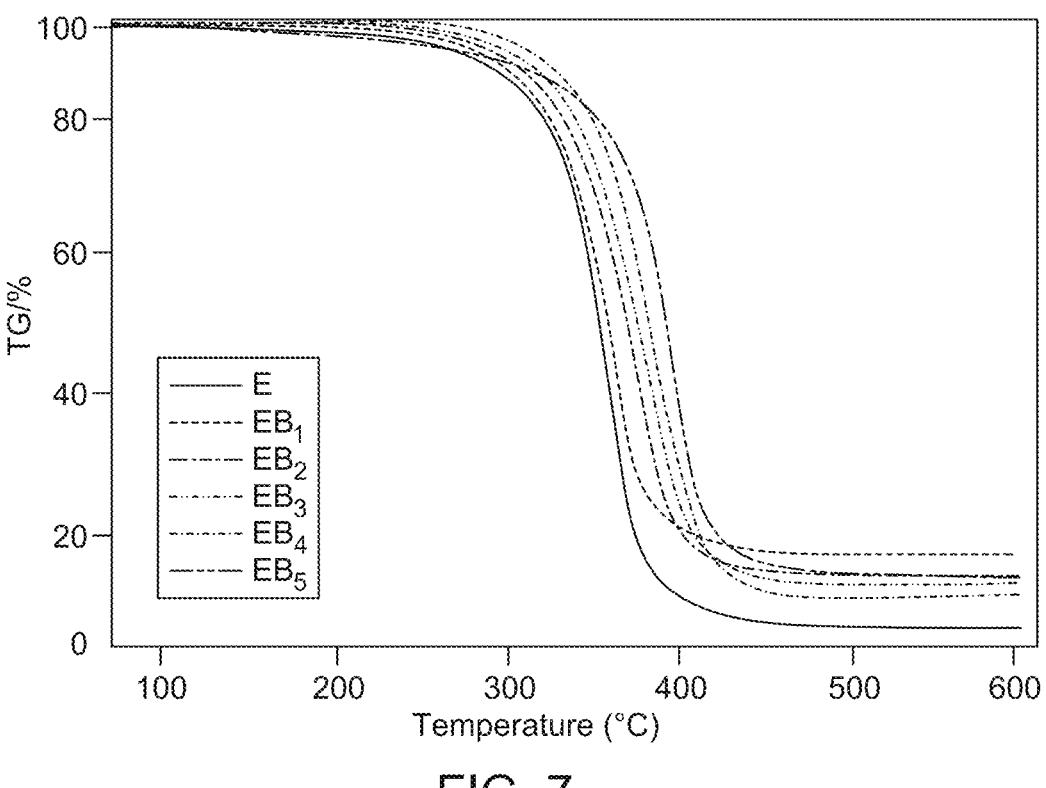
FIG. 7 shows a thermogravimetric analysis (TGA) plot for various cured composite materials, according to certain embodiments.
Figure 8:
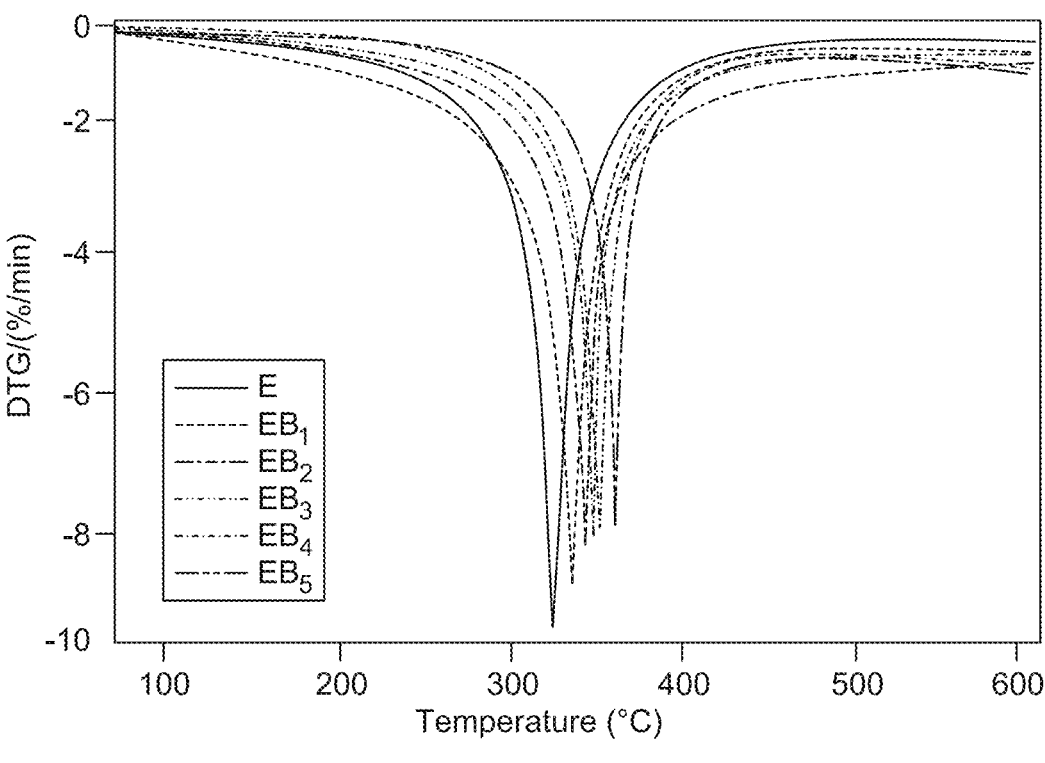
FIG. 8 shows a difference thermogravimetry ratio (DGA) plot for various cured composite materials, according to certain embodiments.

Referring to FIG. 7, the cured composite material has a mass loss of up to 90 wt. % based on an initial weight of the composite material, preferably up to 80 wt. %, or even more preferably up to 70 wt. % based on the initial weight of the composite material, as depicted in FIG. 7. Other ranges are also possible.

The inclusion of the biosilica particles from the biomass rice husk in the curable composition demonstrated enhanced mechanical properties (tensile and flexural properties), thermal properties, and good resistance to oxygen penetration up to 1 to 2 vol. %. Additionally, the curable composition of the present disclosure can be used as an effective coating material for corrosion-prone metallic surfaces and other household coating applications.

EXAMPLES

The following examples demonstrate a curable composition as described herein. The examples are provided solely for illustration and are not to be construed as limitations of the present disclosure, as many variations thereof are possible without departing from the spirit and scope of the present disclosure.

Example 1: Materials

The epoxy resin used for this study was a liquid diglycidyl ether of Bisphenol-A (DGEBA) type (Huntsman India Ltd. Mumbai, Araldite LY556) having a density of 1.18 g/cm³ with an equivalent weight per epoxide group of 195 g/mol at 25° C. Triethylenetetramine, an aliphatic hardener having a density of 0.98 g/cm³. was used as a curing agent. The silane surface modifier 3-aminopropyltriethoxysilane having a molecular weight of 179.29 g/mol, was purchased from Sigma Aldrich, USA. The supporting chemicals like ethanol, distilled water, HCl, acetic acid, and Whatman filter paper were purchased from Metro Composites, Chennai, India.

Example 2: Preparation of Biosilica from Rice Husk

Referring to FIG. 2A, a schematic illustration of a process of preparing the biosilica material from rice husk is illustrated (200). The rice husk (202) has been cleansed of impurities, including rice leaves, sand, and gravel. The rice husk was then rinsed for about 90 minutes with normal water (204). After washing, the rice husk was washed with distilled water and steeped for 4 h in HCl of 1 N 1.5 L (206). After that, the rice husk was dried in an oven at 60° C. (208). This rice husk was then placed in a utensil and heated in a furnace at a temperature of 500° C. for 6 h to form white ash, henceforth referred to as rice husk ash (210). A 500 mL solution of 0.5 M NaOH was prepared, and then the rice husk ash was dissolved in the solution (212). The mixture was then heated at 100° C. while stirring for four hours, cooled to room temperature, and filtered using Whatman filter paper No. 41 [N. Balaji, et al., Investigation on DMA, fatigue and creep behaviour of rice husk ash biosilica-prickly pear short fibre-reinforced epoxy resin composite, SILICON (2022) 1-7, which is incorporated herein by reference in its entirety]. The filtrate was referred to as sodium silicate solution and was typically kept at ambient temperature (214). Next, a 10% $H_2SO_4$ solution is gradually added to the extracted sodium silicate solution, and the pH is adjusted to 7. The mixture is then agitated constantly for 124 h with a magnetic stirrer and then kept for another 224 h to create a white gel-shaped precipitate. The precipitate was repeatedly rinsed with distilled water and heated in a beaker at 70° C. for approximately 20 h to create xerogel silica (216). The xerogel silica was then pulverized for many hours in a mortar to get a fine size of biosilica particles (218) [S. Hanish Anand, N. Venkateshwaran, Effect of heat treatment and biosilica on mechanical, wear, and fatigue behavior of Al—TiB2 in situ metal matrix composite, Biomass Convers. Bioref. (2021) 1-13, which is incorporated herein by reference in its entirety].

Example 3: Preparation of Silane-Modified Biosilica Material

Referring to FIG. 2B, a schematic illustration of a method of preparation of the silane-modified biosilica material (250) is illustrated. The silane surface treatment on the biosilica particles was carried out using an aqueous solution followed by hydrolysis. The biosilica particles were thoroughly mixed in an ethanol-water solution as produced. A mixture of 95% ethanol and 5% water was collected and gently stirred for 10 min. Typically, water was added to adjust the pH of the solution to around 4.5 to 5.5. To commence the acid hydrolysis process, 4 N acetic acid was introduced. The required quantity of silane coupling agent, typically 2-4 wt. % of APTMS (252), was added dropwise until a homogenous mixture was obtained and treated with 5-10 minutes of moderate stirring (254). The biosilica particles were submerged in an ethanol-water solution for 10 minutes. The precipitating biosilica particles were manually drained out from an aqueous medium (256). The precipitated particle was rinsed with ethanol to remove excess silane and then dried in an oven at 110° C. for 10 min (258) to remove moisture and produce Si—O—Si compounds (260) [A. Rajadurai, Thermo-mechanical characterization of siliconized E-glass fiber/hematite particles reinforced epoxy resin hybrid composite, Appl. Surf. Sci. 384 (2016) 30 (2016); V. R. Arun Prakash, R. Viswanthan, Fabrication and characterization of echinoidea spike particles and kenaf natural fibre-reinforced Azadirachta-Indica blended epoxy multi-hybrid bio composite, Compos. A Appl. Sci. Manuf. 118 (2019), each of which is incorporated herein by reference in its entirety].

Example 4: Preparation of a Cured Composite Material

The hand layup process was used to create the cured composite coating laminates. In this predetermined quantity of epoxy resin and silane-modified biosilica material were combined, and then ultrasonically whirled for 20 min at a frequency of 20 MHz to form a mixture. Then the solution was then combined in a 1:10 ratio with a curing agent and poured over a silicon rubber mold to form the cured composite material. The cured composite materials were cured for 24 h at room temperature and post-cured for 48 h [A. Rajadurai, Inter laminar shear strength behavior of acid, base and silane treated E-glass fibre epoxy resin composites on drilling process, Def. Technol. 13 (2017) 1, which is incorporated herein by reference in its entirety]. The volume % of the various cured composite materials manufactured is listed in Table 1.

TABLE 1

| Coating cured composite composition | | |
| --- | --- | --- |
| Cured Composite Material | Epoxy resin (vol. %) | Biosilica (vol. %) |
| E | 100 | — |
| EB1 | 99.75 | 0.25 |
| EB2 | 99.50 | 0.5 |
| EB3 | 99 | 1 |
| EB4 | 98 | 2 |
| EB5 | 96 | 4 |

Example 5: Test Samples Preparation

The resulting cured composite materials were adequately cleaned and evaluated for visual faults after removal from the mold. The test sample was cut according to ASTM standards using an abrasive water jet (Maxim water jets 1515, KENT, 800 E. Summit St. Kent, OH 44242, USA) to create identical test specimens. The abrasive size of 80 mesh, rate of flow of 0.35 Kg/min, exerting pressure of 340 MPa, and nozzle diameter of 1.1 mm were fixed as machining parameters [Ferhat Ceritbinmez, Ahmet Yapici, An investigation on cutting of the MWCNTs doped composite plates by AWJ, Arab. J. Sci. Eng. 45 (2020) 7, which is incorporated herein by reference in its entirety].

Example 6: Mechanical Analysis

The tensile and flexural testing was performed on the cured composite materials in accordance with ASTM D-638 and 790, respectively. The tensile specimens are in dog bone shape with a thickness of 3 mm, span length of 33 mm, total width of 19 mm, and total length of 115 mm. Similarly, the flexural specimens are in a rectangular shape of 63.5×12.7×3 mm. The test was performed using a universal testing machine (INSTRON 4355, Coronation Rd, High Wycombe HP12 3SY, UK) with a 1.5 mm/min cross-head speed. A Shore-D durometer, blue steel India was used to test the microhardness of the cured composite material in accordance with ASTM D 2240.

Example 7: Thermal Analysis

The thermogravimetry study on cured composite materials was done using a TGA thermo-scanner NETZSCH STA Jupitar, 409 PL Luxx, Germany. The test samples were scanned from 30 to 700° C. at a heating rate of 10° C./min. Similarly, the thermal conductivity was measured using Lee's disc method with a sample diameter of 11.2 cm. The steam chamber was heated by 2° C./min until the steady state temperature was reached. Using the difference in temperature of both upper and bottom heating chambers (T1 & T2), the thermal conductivity was calculated with the unit W/mK.

Example 8: Barrier Properties

The oxygen and water vapor permeability of the cured composite materials were calculated by a water vapor permeability tester and an oxygen permeability tester (Noselab Ats and Lyssy L80-5000, Via del Lavoro, 30, 20813 Bovisio-masciago MB, Italy). This test was conducted at 25° C. under 90% and 0% relative humidity. The testing procedure was exactly followed by ASTM F1249-90 for water vapor permeability. Furthermore, ASTM D-3985 procedures are used for the oxygen permeability test. The test samples used here were 150 mm in diameter for water permeability and 50 mm in diameter for oxygen permeability. Five repeated measurements were taken at different locations on the cured composite material, and a mean value was calculated.

Example 9: Morphological Study

The biosilica dispersion and fractographic images were scanned using a field emission scanning electron microscope (TESCAN, MIRA 3, Wellbrook Court, Girton, Cambridge, CB3 ONA, UK). The images were captured from 3.0 to 10.0 kV charging level, and the samples were coated with gold prior to scanning to prevent the charging effect.

Example 10: Results

Figure 3:
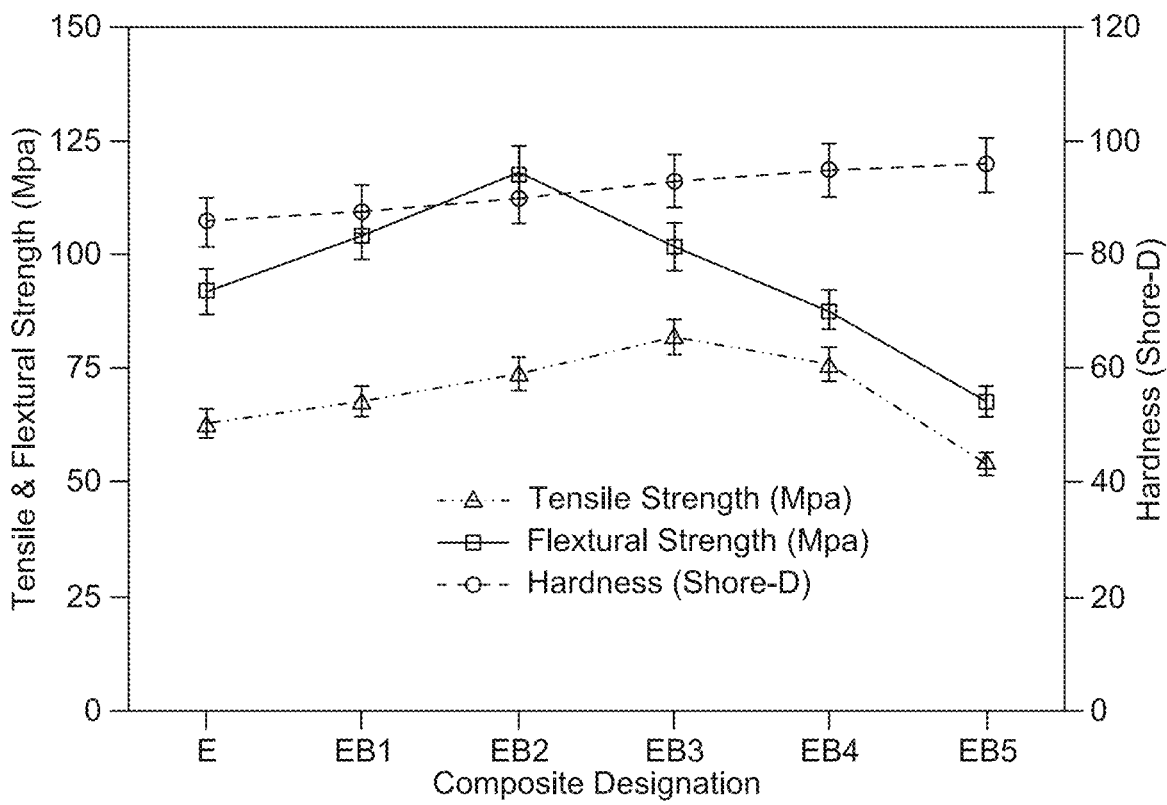
FIG. 3 is a plot depicting various mechanical properties (tensile strength, flexural strength, and hardness) of various cured composite materials designated E (pure epoxy), EB1 (99.75% of resin, and 0.25% biosilica), EB2 (99.5% of resin, and 0.5% biosilica), EB3 (99% of resin, and 1% biosilica), EB4 (98% of resin, and 2% biosilica), and EB5 (96% of resin, and 4% biosilica), according to certain embodiments.

The mechanical properties like tensile, flexural strength, and hardness for various cured composite material designations are illustrated in FIG. 3. The cured composite material may be prepared from the curable composition containing different amount of biosilica. Cured composite material E showed a lesser value than other cured composite materials. The values for tensile, flexural strength, and hardness test was found to be around 63 MPa, 92 MPa, and 86 shore-D, correspondingly. These lower values are due to the brittle nature of epoxy, which forms the main constituent of the cured composite material E. The addition of the silane-treated biosilica particles from 0.25 to 1.0 vol. % increased the strength value maximum up to 82 MPa, 102 MPa, and 93 shore-D for tensile, flexural, and hardness, respectively. This is because the silane treatment of the biosilica bioparticles enhanced bonding between the biosilica particles and the epoxy resin (matrix) by even dispersion of the biosilica particles throughout the matrix. However, further addition of the biosilica particles from 2.0 to 4.0 vol. % decreased the mechanical properties; the resulting cured composite material was more brittle and possessed lower tensile and flexural properties. However, the hardness was found to increase with the increase in the biosilica particles. A maximum hardness of 96 shore-D was noted for cured composite material EB5. The increase in the hardness value is due to the effective dispersion of the biosilica particles. Hence, the matrix could not stretch easily at the time of loading and offered high resistance against the penetration of the indenter [H. Alshahrani, A. P. VR, Mechanical, wear, and fatigue behavior of alkali-silane treated areca fiber, RHA biochar, and cardanol oil-toughened epoxy biocomposite, Biomass Convers. Bioref. (2022); J. Parivendhan Inbakumar, S. Ramesh, Mechanical, wear and thermal behaviour of hemp fibre/egg shell particle reinforced epoxy resin bio composite, Trans. Can. Soc. Mech. Eng. 42 (2018) 3, each of which is incorporated herein by reference in its entirety].

FIG. 4A-FIG. 4D show the scanning electron microscopy (SEM) images of neat epoxy (E) and epoxy composite materials EB2, EB3, and EB5. The neat epoxy resin produced (FIG. 4A) a flat and large river-marked fractured surface, which revealed the extreme brittleness of the epoxy resin. However, adding the biosilica particles into the epoxy resin marginally improved the load-sharing phenomenon. The toughness of the cured composite material improved up to 1 vol. % of the biosilica particle addition (FIG. 4B). At this stage, the biosilica particles are uniformly dispersed in the matrix and restricted the development of cracks. The fractograph of cured composite material EB3 (FIG. 4C) showed a highly wavy structure in the fractured portion, indicating an improvement in the toughness. No clusters were identified in the surface morphological view. FIG. 4D shows particle agglomerations at some places due to the large volume of biosilica particles up to 4 vol. % in the matrix. This is due to the local attraction force between the biosilica particles, even though they are silane-treated. Due to the agglomerations, the strength also got reduced with a poorer load transfer phenomenon [Prakash, V. A., & Rajadurai, A. (2016). Mechanical, thermal and dielectric characterization of Iron oxide particles dispersed glass fiber epoxy Resin hybrid composite. Digest J Nanomater Biostruct, 11 (2), 373-80, which is incorporated herein by reference in its entirety].

Figure 5:
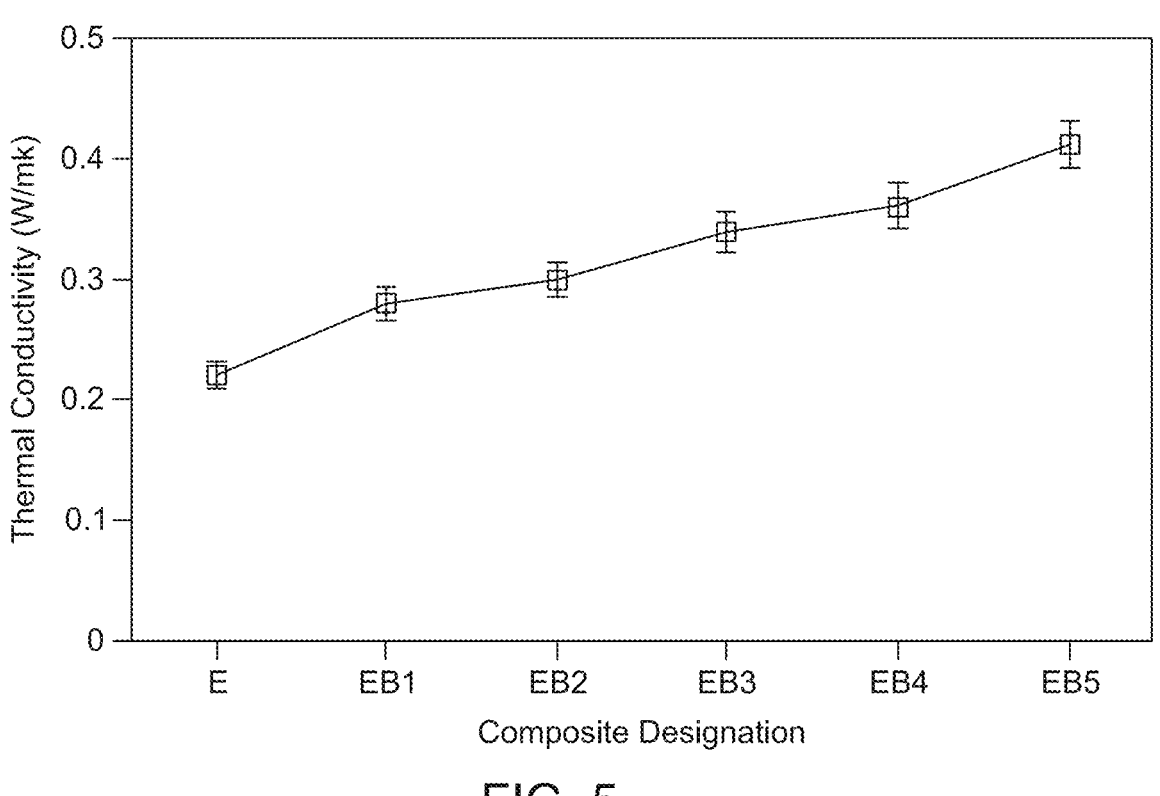
FIG. 5 is a thermal conductivity plot for various cured composite materials, according to certain embodiments.

The thermal conductivity of the various cured composite materials is shown in FIG. 5. The composite material designation E shows very poor thermal conductivity of 0.22 W/mK due to the absence of heat-conducting material, resulting in lesser thermal conductivity [Karthigairajan, M., Nagarajan, P. K., Raviraja Malarvannan, R., Ramesh Bapu, B. R., Jayabalakrishnan, D., Maridurai, T., & Shanmuganathan, V. K. (2021). Effect of silane-treated rice husk derived biosilica on visco-elastic, thermal conductivity and hydrophobicity behavior of epoxy biocomposite coating for air-duct application. Silicon, 13, 4421-4430, which is incorporated herein by reference in its entirety]. Adding silane-modified biosilica particles at various concentrations, namely, 0.25, 0.5, 1.0, 2.0, and 4.0 vol. %, increased the thermal conductivity to 0.28, 0.3, 0.34, 0.36 and 0.41 W/mK, respectively. This is because silane-modified biosilica particles are uniformly dispersed in the matrix form a continuous network, thereby transferring heat through vibration easily, causing an increase in thermal conductivity [Alshahrani, H., Prakash, V. R. A. Effect of silane-grafted orange peel biochar and areca fibre on mechanical, thermal conductivity and dielectric properties of epoxy resin composites. Biomass Conv. Bioref. (2022), which is incorporated herein by reference in its entirety].

The TGA thermogram for the various cured composite materials is shown in FIG. 7. Pure epoxy resin (E) shows an initial decomposition temperature of less than 400° C. The moderate thermal stability was because of the highly cross-linked epoxy's molecular structure. The inclusion of the biosilica particles resulted in an increase in the thermal stability for 0.2, 0.5, 1.0, 2.0, and 4.0 vol. % additions (EB1, EB2, EB3, EB4, and EB5). The silane surface-treated biosilica particles need a higher temperature to deplete the silane layer on the surface of the biosilica particles because a temperature higher than 400° C. was required for the evaporation of silane. Thus, the initial decomposition temperature did not reduce for any cured composite materials from EB1-EB5. Moreover, including silane-treated biosilica particles strengthened the epoxy resin matrix and increased its molecular weight. Since density is related to glass transition temperature and mass decomposition, the self-rotation of secondary epoxy molecules is hampered, requiring a lot of heat energy to overcome the inertia; hence increased energy to spin the epoxy molecules, resulting in increased thermal stability [S. Mahalingam, A. Suresh Babu, Characterization of 3-aminopropyltriethoxysilane treated stacked silicate nanoclay and red Matta-RHA biosilica woven ramie fibre epoxy composite, SILICON (2022), 1-11, which is incorporated herein by reference in its entirety]. Moreover, silica is a ceramic material, which requires additional energy to self-activate. Its high heat capacity improved the heat absorption rate upon heating. Thus improved thermal stability was observed for the biosilica-dispersed epoxy composite material.

Figure 6:
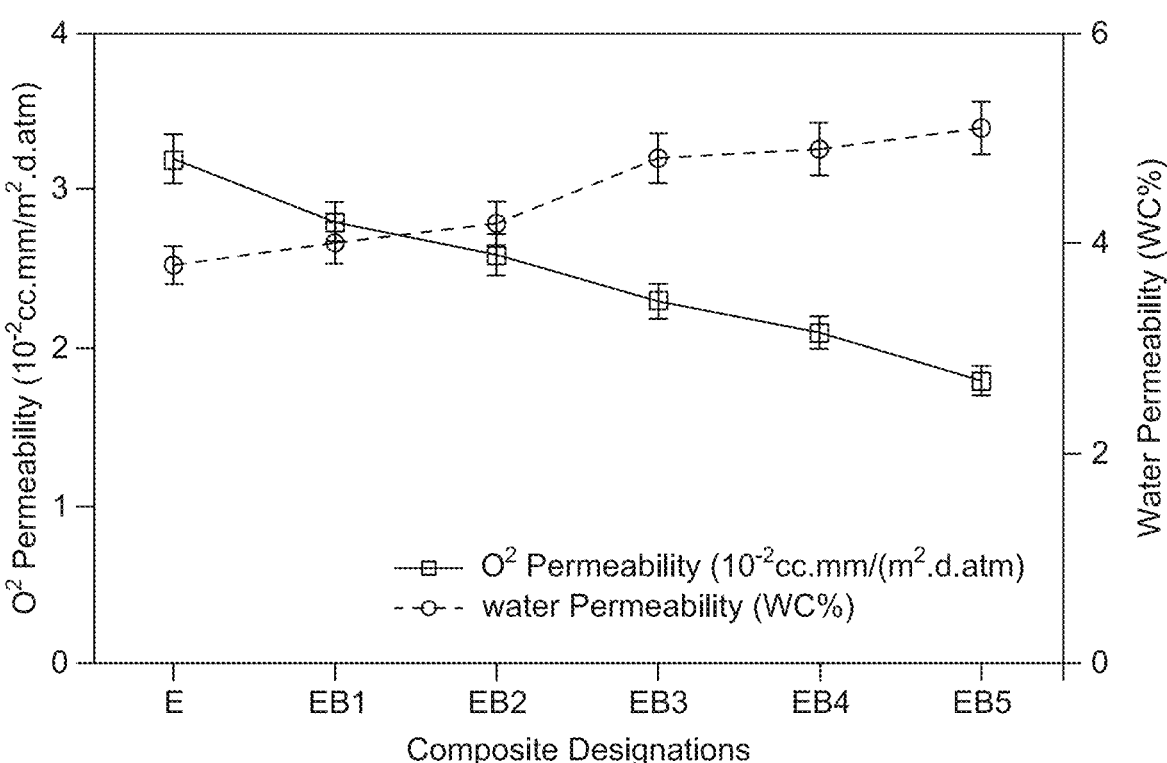
FIG. 6 shows a water and oxygen permeability plot for various cured composite materials, according to certain embodiments.

The water permeability curves for the various cured composite materials are presented in FIG. 6. The cured composite material designated E shows lesser water permeability due to the pure epoxy, which has a lesser attraction towards water molecules. Also, pure epoxy has a higher cross-liking ability, thereby preventing the water molecules from getting in. However, the introduction of the biosilica particles, from 0.25 to 4.0 vol. %, slightly increased the water permeability. This addition improved the water permeability maximum up to 5.1 water content (WC) % for the cured composite material EB5. The reason behind this increment is that the biosilica particles have oxygen molecules that react with the OH molecules from the moisture and form a hydroxyl state of silica [Songyou Lian, Jintong Zhang, Jiangyong Wang, Congkang Xu, Hendrik C. Swart, Jacobus J. Terblans, A model for adsorption and diffusion in water vapor barrier films, Phys. Status Solidi B 258 (2021) 6, which is incorporated herein by reference in its entirety]. Similarly, FIG. 6 shows the oxygen permeability for various cured composite materials. The cured composite materials showed higher oxygen permeability due to pure epoxy's ability to absorb the oxygen molecules and react easily with them. But further addition of the biosilica particles improved the resistance to oxygen permeability. For vol. % of the biosilica particles, 0.2, 0.5, 1.0, 2.0, and 4.0, the oxygen permeability decreased as 2.8, 2.6, 2.3, 2.1, and 1.8 ($10^{-2}$ cc·mm/(m$^2$·d·atm) correspondingly. This decrement in oxygen permeability is because silane-treated biosilica particles are already saturated with oxygen molecules, thus preventing the penetration of more oxygen molecules [D. Jayabalakrishnan, et al., Mechanical, dielectric, and hydrophobicity behavior of coconut shell biochar toughened Caryota urens natural fiber reinforced epoxy composite, Polym. Compos. 43 (2021) 493-502, which is incorporated herein by reference in its entirety].

A cured composite coating was prepared using silane-modified biosilica material derived from rice husk. The rice husk ash was converted to biosilica particles via a thermochemical method, and the silane treatment on the biosilica particles was done via the aqueous solution method. Further, the biosilica particles are mixed with a resin using an ultrasonicator to prepare the cured composite material. The prepared cured composite material was evaluated for its physical, mechanical, thermal, and barrier properties. The results indicate that the cured composite coating of the present disclosure shows that i) The treated biosilica particles are uniformly dispersed in the matrix rather than clustering, ii) the presence of biosilica particles up to 1 and 2 vol. % improved the tensile and flexural properties; and iii) the composite material showed improved oxygen permeation resistance upon the addition of the biosilica particles. However, the water permeation stability was less affected by the addition of treated biosilica particles.

The cured composite coating of the present disclosure demonstrated improved mechanical, thermal, and barrier properties which could be attributed to the epoxy composites strengthened by the addition of the biosilica particles. The cured composite coating of the present disclosure can be used as a coating material for corrosion-prone metallic surfaces and other domestic coating applications.

Numerous modifications and variations of the present disclosure are possible in light of the above teachings. It is therefore to be understood that within the scope of the appended claims, the invention may be practiced otherwise than as specifically described herein.

The invention claimed is:

1. A curable composition, comprising:
at least one polyamine;
an epoxy resin; and
a silane-modified biosilica material;
wherein the silane-modified biosilica material is derived from rice husk;
wherein the silane-modified biosilica material is present in the curable composition at a concentration of 0.01 to 10 wt. %, based on a total weight of the curable composition; and
wherein the silane-modified biosilica material has an average particle size of 1 to 10 micrometers (µm).

2. The curable composition of claim 1, wherein the at least one polyamine comprises a polyalkylene polyamine, and wherein the polyalkylene polyamine comprises at least one polyamine selected from the group consisting of piperazine, aminoethylpiperazine, ethylenediamine, ethyleneimine, diethylenetriamine (DETA), pentaethylenehexamine (PEHA), hexaethyleneheptamine (HEHA), tetraethylenepentamine (TEPA), triethylenetetramine (TETA), and a mixture thereof.

3. The curable composition of claim 1, wherein the epoxy resin comprises at least one resin selected from the group consisting of a bisphenol A epoxy resin, a bisphenol F epoxy resin, a novolak epoxy resin, an aliphatic epoxy resin, a glycidylamine epoxy resin, an epoxidized vegetable oil, and a mixture thereof.

4. The curable composition of claim 3, wherein the epoxy resin is a bisphenol A epoxy resin, and wherein the bisphenol A epoxy resin is bisphenol A diglycidyl ether.

5. The curable composition of claim 1, wherein a volume ratio of the at least one polyamine to the epoxy resin is in a range of 20:1 to 1:1.

6. A cured composition obtained by curing the curable composition of claim 1, wherein the silane-modified biosilica material particles are uniformly distributed throughout the cured composition.

7. A method of making a cured composite material, comprising:

mixing an epoxy resin and a silane-modified biosilica material, and sonicating to form a mixture;

adding at least one polyamine to the mixture to form the curable composition of claim 1; and curing the curable composition by mixing thereby allowing the epoxy resin, the silane-modified biosilica material and the at least one polyamine to react and form the cured composite material;

wherein the silane-modified biosilica material is present in the curable composition at a concentration of 0.2 to 5 wt. %, based on a total weight of the curable composition; and wherein a volume ratio of the at least one polyamine to the epoxy resin is in a range of 15:1 to 5:1.

8. The method of claim 7, wherein the cured composite material has a tensile strength of 50 to 90 MegaPascal (MPa) according to ASTM D-638 standard test method.

9. The method of claim 7, wherein the cured composite material has a flexural strength of 60 to 120 MPa according to ASTM D-790 standard test method.

10. The method of claim 7, wherein the cured composite material has a hardness of 80 to 130 shore-D according to ASTM D-2240 standard test method.

11. The method of claim 7, wherein the cured composite material has a water vapor permeability of 2 to 4 water content (WC %) according to ASTM F1249-90 standard test method.

12. The method of claim 7, wherein the cured composite material has an oxygen permeability of 2 to 3.5 $(10^{-2}$ cc·mm/(m$^2$·d·atm)) according to ASTM D-3985 standard test method.

13. The method of claim 7, wherein the cured composite material has a thermal conductivity of 0.2 to 0.5 Watts per meter-Kelvin (W/mK) as determined by TGA.

14. The method of claim 7, further comprising:

preparing the silane-modified biosilica material from rice husk by:

cleaning raw rice husk and steeping in a first acid solution to form acid-treated rice husk in a first mixture;

removing the acid-treated rice husk from the first mixture and heating at a temperature of at least 400° C. to form rice husk ash (RHA);

mixing the rice husk ask in an alkaline solution, heating, and filtering to form a sodium silicate solution;

neutralizing the sodium silicate solution with a second acid solution under agitation to form a gel-like precipitate in a second mixture;

removing the gel-like precipitate from the second mixture, washing, drying and pulverizing to form a silica xerogel;

mixing the silica xerogel in a solvent mixture to form a silica solution;

adjusting the pH of the silica solution to 4 to 6;

dropwise adding a silane coupling agent to the silica solution and mixing to form precipitated particles of the silane-modified silica material in a reaction mixture;

removing the precipitated particles from the reaction mixture, washing, and drying to form the silane-modified biosilica material.

15. The method of claim 14, wherein the first acid solution comprises at least one acid selected from the group consisting of a hydrochloric acid, a sulfuric acid, a nitric acid, a phosphoric acid, and a citric acid.

16. The method of claim 14, wherein the alkaline solution comprises sodium hydroxide, sodium carbonate, potassium hydroxide, potassium carbonate, lithium hydroxide, and lithium carbonate.

17. The method of claim 14, wherein the second acid solution comprises at least one acid selected from the group consisting of a hydrochloric acid, a sulfuric acid, a nitric acid, a phosphoric acid, and a citric acid.

18. The method of claim 14, wherein the solvent mixture comprises at least two solvents selected from the group consisting of a ketone solvent, an ester solvent, an alcohol solvent, an amide solvent, an ether solvent, and water.

19. The method of claim 14, wherein the solvent mixture comprises an alcohol solvent and water, and wherein a volume ratio of the alcohol solvent and water is in a range of 50:1 to 10:1.

20. The method of claim 14, wherein the silane coupling agent is an amino-silane coupling agent selected from the group consisting of N-(2-aminoethyl)-3-aminopropyltrimethoxysilane, (aminoethylaminomethyl) phenyltrimethoxysilane, N-(2-aminoethyl)-3-aminopropyl tris(2-ethylhexoxy) silane, 3-aminopropyltrimethoxysilane, trimethoxysilylpropyldiethylenetriamine, bis(2-hydroxyethyl)-3-aminopropyltrimethoxysilane, aminopropyltriethoxysilane, and 4-aminobutyltriethoxysilane.

\* \* \* \* \*